United States Patent
Hayashi

(10) Patent No.: US 12,289,027 B2
(45) Date of Patent: Apr. 29, 2025

(54) MAGNETIC FIELD GENERATING DEVICE AND ELECTRIC MOTOR INCLUDING THE SAME

(71) Applicant: KOBE STEEL, LTD., Hyogo (JP)

(72) Inventor: Shumpei Hayashi, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 225 days.

(21) Appl. No.: 18/249,354

(22) PCT Filed: Nov. 26, 2021

(86) PCT No.: PCT/JP2021/043495
§ 371 (c)(1),
(2) Date: Apr. 17, 2023

(87) PCT Pub. No.: WO2022/118761
PCT Pub. Date: Jun. 9, 2022

(65) Prior Publication Data
US 2023/0402909 A1    Dec. 14, 2023

(30) Foreign Application Priority Data
Dec. 1, 2020    (JP) ................. 2020-199344

(51) Int. Cl.
*H02K 41/03*    (2006.01)
*H01F 7/02*    (2006.01)

(52) U.S. Cl.
CPC ............ *H02K 41/031* (2013.01); *H01F 7/02* (2013.01); *H01F 7/0231* (2013.01); *H02K 2213/03* (2013.01)

(58) Field of Classification Search
CPC .. H02K 41/031; H02K 41/03; H02K 2213/03; H01F 7/02; H01F 7/0205;
(Continued)

(56) References Cited

U.S. PATENT DOCUMENTS

2011/0278958 A1* 11/2011 Kawakami ........... H02K 41/031
                                                               310/12.25
2013/0082545 A1*  4/2013 Goto .................... H02K 41/031
                                                               310/12.24
(Continued)

FOREIGN PATENT DOCUMENTS

JP    H08-140332 A    5/1996
JP    2010-130871 A   6/2010
(Continued)

OTHER PUBLICATIONS

Machine translation of JP-7391783-B2. (Year: 2023).*

*Primary Examiner* — Michael Andrews
(74) *Attorney, Agent, or Firm* — Studebaker Brackett PLLC

(57) ABSTRACT

Provided are a magnetic field generating device and an electric motor with which it is possible to generate a large amount of magnetic flux using a simple construction. The magnetic field generating device is provided with a magnetic pole element, a facing magnetic body opposing the same in an opposing direction, and an inner support member. The magnetic pole element includes a plurality of first iron cores, a plurality of second iron cores, a plurality of third iron cores, a plurality of fourth iron cores, and a plurality of back surface permanent magnets. Each of the plurality of first to fourth iron cores has a magnetic pole surface opposing the facing magnetic body and a back surface on the opposite side thereto, and the plurality of back surface permanent magnets are disposed on the back surfaces of each of the plurality of first to fourth iron cores. The plurality of first and third iron cores are arranged alternately in a first arrangement direction perpendicular to the opposing direction, to form a first iron core row. The plurality of second and fourth iron cores are arranged alternately in the first arrangement direction to form a second iron core row. The inner support (Continued)

member is positioned between the first iron core row and the second iron core row, and supports each of the first iron core row and the second iron core row on both sides of the inner support member in a second arrangement direction.

11 Claims, 22 Drawing Sheets

(58) Field of Classification Search
CPC .... H01F 7/0231; H01F 7/0236; H01F 7/0247; H01F 7/0273; H01F 7/0278
USPC ............................................ 310/12.24, 12.25
See application file for complete search history.

(56) References Cited

U.S. PATENT DOCUMENTS

| | | | | |
|---|---|---|---|---|
| 2013/0093264 | A1* | 4/2013 | Aoyama | H02K 1/06 310/12.05 |
| 2017/0207690 | A1* | 7/2017 | Paweletz | H02K 33/16 |
| 2017/0264146 | A1* | 9/2017 | Shibata | H02K 29/03 |
| 2023/0231459 | A1* | 7/2023 | Hayashi | H02K 41/031 310/12.18 |

FOREIGN PATENT DOCUMENTS

| | | | |
|---|---|---|---|
| JP | 2010-183651 A | 8/2010 | |
| JP | 2015-154589 A | 8/2015 | |
| JP | 2019-201441 A | 11/2019 | |
| JP | 2020-102987 A | 7/2020 | |
| JP | 7391783 B2 * | 12/2023 | ............... H02K 1/22 |
| WO | 2018/174235 A1 | 9/2018 | |

* cited by examiner

MAGNETIC FIELD GENERATING DEVICE AND ELECTRIC MOTOR INCLUDING THE SAME

TECHNICAL FIELD

The present invention relates to a magnetic field generating device that generates a magnetic field in a gap between a magnetic pole element and a facing magnetic body which faces the magnetic pole element and also relates to an electric motor that includes the magnetic field generating device.

BACKGROUND ART

An electric motor of related art described in PTL 1 is known. The electric motor includes a magnetic pole element and an armature. The magnetic pole element includes a plurality of magnetic pole unit cells. Each of the plurality of magnetic pole unit cells includes a magnetic pole element core and a plurality of permanent magnets. The magnetic pole element core has a plurality of outer surfaces which include an armature facing surface facing the armature. The plurality of permanent magnets have a first pole and a second pole opposite to the first pole and are disposed on an outer surface other than the armature facing surface out of the plurality of outer surfaces of the magnetic pole element core. The plurality of permanent magnets have the first pole and the second pole opposite to the first pole and are disposed such that the first pole or the second pole faces the magnetic pole element core. The magnetic pole element core has a projecting portion which is positioned between the armature and a permanent magnet disposed on an outer surface adjacent to the armature facing surface out of the plurality of outer surfaces.

Although the electric motor can generate a large amount of magnetic flux, a complex structure is necessary for supporting the plurality of magnetic pole unit cells.

CITATION LIST

Patent Literature

PTL 1: Japanese Unexamined Patent Application Publication No. 2020-102987

SUMMARY OF INVENTION

The present invention is aimed at providing a magnetic field generating device that can generate a large amount of magnetic flux with a simple structure and an electric motor including the magnetic field generating device.

A magnetic field generating device is provided, and the magnetic field generating device includes a magnetic pole element and a facing magnetic body. The magnetic pole element includes a plurality of magnetic element iron cores, a plurality of permanent magnets, and at least one support member. The plurality of magnetic element iron cores are each formed of a magnetic material, and the at least one support member is formed of a non-magnetic material. The facing magnetic body is disposed so as to face the magnetic pole element in an opposing direction with a gap interposed between the facing magnetic body and the magnetic pole element. The plurality of magnetic element iron cores are arranged along an arrangement plane perpendicular to the opposing direction. The plurality of magnetic element iron cores include a plurality of first iron cores, a plurality of second iron cores, a plurality of third iron cores, and a plurality of fourth iron cores. The plurality of first iron cores and the plurality of third iron cores are disposed so as to be alternately arranged along a first arrangement direction extending along the arrangement plane, thereby forming a first iron core row. The plurality of second iron cores and the plurality of fourth iron cores are disposed so as to be alternately arranged along the first arrangement direction, thereby forming a second iron core row. The plurality of first iron cores are respectively adjacent to the plurality of second iron cores in a second arrangement direction. The second arrangement direction is a direction extending along the arrangement plane and perpendicular to the first arrangement direction. The plurality of third iron cores are respectively adjacent to the plurality of fourth iron cores in the second arrangement direction. The first iron cores include a first magnetic pole surface that has a first magnetic pole and that faces the facing magnetic body in the opposing direction and a first back surface that faces an opposite side from the first magnetic pole surface in the opposing direction. The second iron cores include a second magnetic pole surface that has a second magnetic pole and that faces the facing magnetic body in the opposing direction and a second back surface that faces an opposite side from the second magnetic pole surface in the opposing direction. The third iron cores include a third magnetic pole surface that has a third magnetic pole and that faces the facing magnetic body in the opposing direction and a third back surface that faces an opposite side from the third magnetic pole surface in the opposing direction. The fourth iron cores include a fourth magnetic pole surface that has a fourth magnetic pole and that faces the facing magnetic body in the opposing direction and a fourth back surface that faces an opposite side from the fourth magnetic pole surface in the opposing direction. The plurality of permanent magnets include a plurality of back surface permanent magnets respectively disposed on the first back surface, the second back surface, the third back surface, and the fourth back surface. The first magnetic pole and the fourth magnetic pole are magnetic poles that are identical to each other and that are opposite to both the second magnetic pole and the third magnetic pole. The second magnetic pole and the third magnetic pole are magnetic poles that are identical to each other and that are opposite to both the first magnetic pole and the fourth magnetic pole. The at least one support member includes an inner support member positioned between the first iron core row and the second iron core row. The inner support member supports the plurality of first iron cores and the plurality of third iron cores on one side of the inner support member in the second arrangement direction, and simultaneously, supports the plurality of second iron cores and the plurality of fourth iron cores on another side of the inner support member in the second arrangement.

An electric motor is provided. The electric motor includes the magnetic field generating device and a coil that is attached to the facing magnetic body in the magnetic field generating device and that forms a magnetic field that moves the magnetic pole element relative to the facing magnetic body in the first arrangement direction.

DESCRIPTION OF EMBODIMENTS

Hereinafter, embodiments of the present invention will be described in detail with reference to the drawings.

Figure 1:
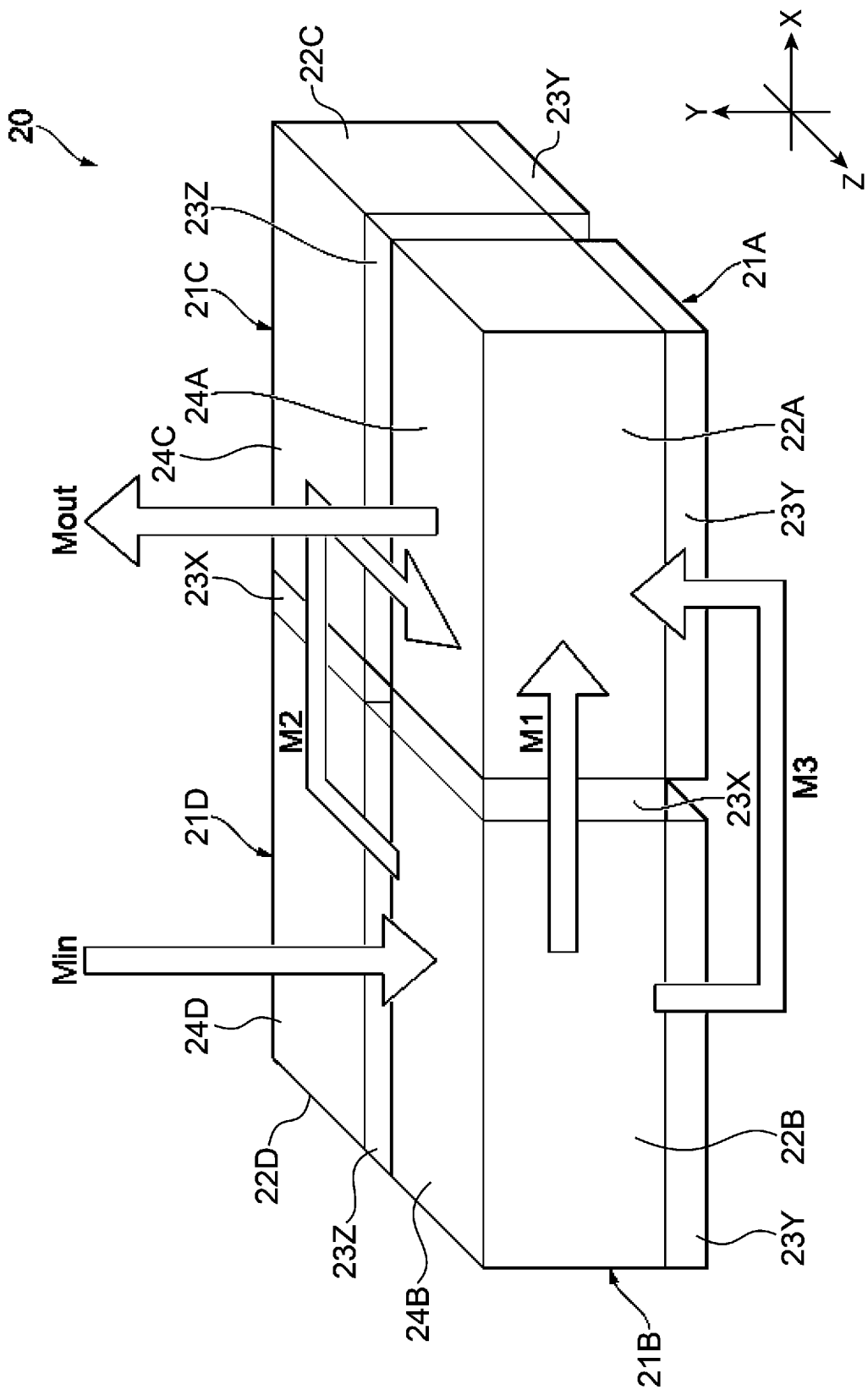
FIG. 1 is a perspective view illustrating a first example of a unit cell having a three-dimensional magnetic pole structure.

FIG. 1 illustrates a unit cell 20A. The unit cell 20A is a first example of a unit cell which is a minimum unit of a magnetic pole element included in a magnetic field generating device that can generate a large amount of magnetic flux. The magnetic pole element includes a plurality of unit cells 20A. The magnetic field generating device includes the magnetic pole element and a facing magnetic body that faces the magnetic pole element in an opposing direction with a gap interposed therebetween. The facing magnetic body includes magnetic bodies such as a permanent magnet and iron.

The unit cell 20A has a three-dimensional magnetic pole structure as illustrated in FIG. 1. The unit cell 20A includes a plurality of magnetic pole element iron cores and a plurality of permanent magnets.

Each of the plurality of magnetic pole element iron cores is a magnetic body, which is a soft magnetic body having a rectangular parallelepiped shape according to the present embodiments. The plurality of magnetic pole element iron cores include a first iron core 22A, a second iron core 22B, a third iron core 22C, and a fourth iron core 22D which are arranged beside each other on the same arrangement plane. The arrangement plane is a flat plane perpendicular to the opposing direction, that is, a flat plane facing the facing magnetic body according to the present embodiments, and a horizontal plane in an orientation illustrated in FIG. 1. The opposing direction is a direction indicated by an arrow Y of FIG. 1 and, hereinafter, may be referred to as a "Y-axis direction" in some cases. The first iron core 22A is adjacent to the third iron core 22C in a first arrangement direction and adjacent to the second iron core 22B in a second arrangement direction. The fourth iron core 22D is adjacent to the second iron core 22B in the first arrangement direction and adjacent to the third iron core 22C in the second arrangement direction. Both the first arrangement direction and the second arrangement direction extend along the arrangement plane, and the second arrangement direction is perpendicular to the first arrangement direction. The first arrangement direction and the second arrangement direction are directions respectively indicated by an arrow Z and an arrow X of FIG. 1 and, hereinafter, may be respectively referred to as a "Z-axis direction" and an "X-axis direction" in some cases.

The first iron core 22A has a first magnetic pole surface 24A that faces the facing magnetic body in the opposing direction (Y-axis direction) and a first back surface that faces the opposite side from the first magnetic pole surface 24A in the opposing direction. The second iron core 22B has a second magnetic pole surface 24B that faces the facing magnetic body in the opposing direction and a second back surface that faces the opposite side from the second magnetic pole surface 24B in the opposing direction. The third iron core 22C has a third magnetic pole surface 24C that faces the facing magnetic body in the opposing direction and a third back surface that faces the opposite side from the third magnetic pole surface 24C in the opposing direction. The fourth iron core 22D has a fourth magnetic pole surface 24D that faces the facing magnetic body in the opposing direction and a fourth back surface that faces the opposite side from the fourth magnetic pole surface 24D in the opposing direction. In the orientation illustrated in FIG. 1, all the first to fourth magnetic pole surfaces 24A to 24D face upward and all the first to fourth back surfaces face downward. The first magnetic pole surface 24A and the fourth magnetic pole surface 24D each form a first magnetic pole (the north pole or the south pole), and the second magnetic pole surface 24B and the third magnetic pole surface 24C each form a second magnetic pole (the south pole or the north pole) opposite to the first magnetic pole.

The plurality of permanent magnets include a plurality of first interposition permanent magnets 23Z, a plurality of second interposition permanent magnets 23X, and a plurality of back surface permanent magnets 23Y.

The plurality of first interposition permanent magnets 23Z are respectively interposed between the magnetic pole element iron cores adjacent to each other in the first arrangement direction (Z-axis direction) out of the plurality of magnetic element iron cores, that is, between the first iron core 22A and the third iron core 22C and between the second iron core 22B and the fourth iron core 22D. The plurality of first interposition permanent magnets 23Z are each polarized in the Z-axis direction.

The plurality of second interposition permanent magnets 23X are respectively interposed between the magnetic pole element iron cores adjacent to each other in the second arrangement direction (X-axis direction) out of the plurality of magnetic element iron cores, that is, between the first iron core 22A and the second iron core 22B and between the third iron core 22C and the fourth iron core 22D. The plurality of second interposition permanent magnets 23X are each polarized in the X-axis direction.

The plurality of back surface permanent magnets 23Y are respectively disposed on the first back surface of the first iron core 22A, the second back surface of the second iron core 22B, the third back surface of the third iron core 22C, and the fourth back surface of the fourth iron core 22D. Each of the first to fourth back surfaces is a surface facing the opposite side from the facing magnetic body out of outer surfaces of a corresponding one of the first to fourth iron cores 22A to 22D, that is, a lower surface in FIG. 1. The plurality of back surface permanent magnets 23Y are each polarized in the Y-axis direction.

The unit cell 20A includes a plurality of magnetic pole blocks arranged on the arrangement plane, that is, a first magnetic pole block 21A, a second magnetic pole block 21B, a third magnetic pole block 21C, and a fourth magnetic pole block 21D. The first magnetic pole block 21A is adjacent to the second magnetic pole block 21B and the third magnetic pole block 21C respectively in the second arrangement direction and the first arrangement direction. The fourth magnetic pole block 21D is adjacent to the second magnetic pole block 21B and the third magnetic pole block 21C respectively in the first arrangement direction and the second arrangement direction.

Each of the first to fourth magnetic pole blocks 21A to 21D includes one of the plurality of magnetic pole element iron cores and a plurality of permanent magnets. The first magnetic pole block 21A, the second magnetic pole block 21B, the third magnetic pole block 21C, and the fourth magnetic pole block 21D respectively include, as the magnetic pole element iron cores, the first iron core 22A, the second iron core 22B, the third iron core 22C, and the fourth iron core 22D.

Each of the plurality of permanent magnets has a main surface that is equal to or slightly larger than an outer surface of the magnetic pole element iron core out of the first to fourth iron cores 22A to 22D at which the permanent magnet is to be disposed, and the permanent magnet is attached to the outer surface so as to cover the outer surface. Each of the plurality of magnetic pole element iron cores has a rectangular parallelepiped shape having six outer surfaces, and the permanent magnets are respectively attached to three outer surfaces out of the six outer surfaces. That is, the permanent magnets are attached to the magnetic pole element iron core so as to allow open surfaces that are three other outer surfaces to be open. The plurality of permanent magnets are disposed such that the magnetic poles of the permanent magnets facing a corresponding one of the plurality of magnetic pole element iron cores to which the permanent magnets are attached are the same. At least one of the three open outer surfaces forms the magnetic pole surface. In the example illustrated in FIG. 1, the facing magnetic body, for example, an armature of the electric motor is disposed above the first to fourth magnetic pole surfaces 24A to 24D that are the upward-facing magnetic pole surfaces with a gap interposed between the facing magnetic body and the first to fourth magnetic pole surfaces 24A to 24D. The magnetic pole of the magnetic pole surface of each of the first to fourth iron cores 22A to 22D is the same as the magnetic pole formed by a first magnet surface that is a surface facing the magnetic pole element iron core in a corresponding one of the plurality of permanent magnets attached to the iron core. Furthermore, the surface facing outward in each of the plurality of permanent magnets, that is, a second magnet surface facing the opposite side from the magnetic pole element iron core has an opposite magnetic pole from the magnetic pole of the magnetic pole surface.

In the unit cell 20A, the magnetic pole blocks adjacent to each other out of the first to fourth magnetic pole blocks 21A to 21D share the permanent magnet interposed between the magnetic pole element iron cores respectively included in the magnetic pole blocks adjacent to each other, that is, the first interposition permanent magnet 23Z or the second interposition permanent magnet 23X. For example, the first magnetic pole block 21A shares the second interposition permanent magnet 23X and the first interposition permanent magnet 23Z respectively with the second magnetic pole block 21B and the third magnetic pole block 21C adjacent to the first magnetic pole block 21A. Likewise, the fourth magnetic pole block 21D shares the first interposition permanent magnet 23Z and the second interposition permanent magnet 23X respectively with the second magnetic pole block 21B and the third magnetic pole block 21C adjacent to the fourth magnetic pole block 21D. Furthermore, each of the first to fourth magnetic pole blocks 21A to 21D includes a corresponding one of the back surface permanent magnets 23Y that are respectively mounted on the first to fourth back surfaces of the first to fourth iron cores 22A to 22D.

In contrast to the above description, two magnetic pole blocks adjacent to each other may include respective permanent magnets independently of each other. For example, the first magnetic pole block 21A may include the second interposition permanent magnet 23X and the first interposition permanent magnet 23Z respectively facing the second magnetic pole block 21B and the third magnetic pole block 21C, and the second magnetic pole block 21B and the third magnetic pole block 21C may respectively include the second interposition permanent magnet 23X and the first interposition permanent magnet 23Z both of which face the first magnetic pole block 21A independently of the first and second interposition permanent magnets 23Z and 23X of the first magnetic pole block 21A. Likewise, the fourth magnetic pole block 21D may include the first interposition permanent magnet 23Z and the second interposition permanent magnet 23X respectively facing the second magnetic pole block 21B and the third magnetic pole block 21C, and the second magnetic pole block 21B and the third magnetic pole block 21C may respectively include the first interposition permanent magnet 23Z and the second interposition permanent magnet 23X both of which face the fourth magnetic pole block 21D independently of the first and second interposition permanent magnets 23Z and 23X of the fourth magnetic pole block 21D. In other words, a pair of interposition permanent magnets 23 respectively belong the magnetic pole blocks adjacent to each other may be interposed between the iron cores adjacent to each other out of the first to fourth iron cores 22A to 22D of the first to fourth magnetic pole blocks 21A to 21D.

In the unit cell 20A, pairs of the magnetic pole block adjacent to each other out of the first to fourth magnetic pole blocks 21A to 21D form a plurality of magnetic paths. For example, a first magnetic path, a second magnetic path, and a third magnetic path as follows are formed as magnetic paths that enter the second magnetic pole blocks 21B as indicated by an arrow Min of FIG. 1 and exit the first magnetic pole block 21A as indicated by an arrow Mout of FIG. 1. As indicated by an arrow M1 of FIG. 1, the first magnetic path enters the first magnetic pole block 21A from the second magnetic pole block 21B through the second interposition permanent magnet 23X between the first iron core 22A and the second iron core 22B. As indicated by an arrow M2 of FIG. 1, the second magnetic path enters the fourth magnetic pole block 21D from the second magnetic pole block 21B through the first interposition permanent magnet 23Z between the second iron core 22B and the fourth iron core 22D, enters the third magnetic pole block 21C from the fourth magnetic pole block 21D through the second interposition permanent magnet 23X between the third iron core 22C and the fourth iron core 22D, and enters the first magnetic pole block 21A from the third magnetic pole block 21C through the first interposition permanent magnet 23Z between the first iron core 22A and the third iron core 22C. As indicated by an arrow M3 of FIG. 1, the third magnetic path exits the second magnetic pole block 21B through the back surface permanent magnet 23Y disposed on the second back surface (lower surface in FIG. 1) of the second iron core 22B and enters the first magnetic pole block 21A through the back surface permanent magnet 23Y disposed on the back surface (lower surface in FIG. 1) of the first iron core 22A.

As described above, in the unit cell 20A, since a plurality of magnetic paths exist in the unit cell 20A, a total sum of effective areas which are the areas of parts of the individual permanent magnets 23X to 23Z through which the magnetic flux passes is large.

Furthermore, since the effective area of each of the plurality of permanent magnets 23X to 23Z is small in the unit cell 20A, a large magnetic resistance can be ensured even when each permanent magnet has a small width. This allows reduction of the demagnetizing field in the unit cell 20A.

The magnitude of the magnetic flux that the plurality of permanent magnets 23X, 23Y, and 23Z output to the outside is proportional to the areas of the parts of the individual permanent magnets through which the magnetic flux passes, that is, the total sum of the effective areas and inversely proportional to the magnitude of the demagnetizing field generated in the individual permanent magnets. Accordingly, in the unit cell 20A having a three-dimensional magnetic pole structure as illustrated in FIG. 1, the plurality of permanent magnets 23X, 23Y, and 23Z can output large magnetic flux to the outside.

As described above, the purpose of providing the three-dimensional magnetic pole structure to the unit cell 20A is to increase energy of the magnetic field in the gap. For example, application of the magnetic field generating device including the unit cell 20A to an electric motor increases the amount of energy in the magnetic field generated in the gap which is a place where the likelihood of the occurrences of interaction with a current input from outside is high. Thus, large magnetic force can be obtained with a small amount of current. The reason for this is that, although a required voltage increases, a joule loss reduces.

The magnetic field generated in the gap by the magnetic field generating device as described above can be used for, for example, a process of screening charged particles and a spectrum. In this case, it is preferable that at least one of a magnetic fluid, magnetic powder, and a magnetic particle be included in the gap.

Furthermore, when the magnetic field generated in the gap by the magnetic field generating device is used for the electric motor, it is preferable that a magnetic fluid be sealed in the gap so as to collect a larger amount of the magnetic flux in the gap by reducing the magnetic resistance in the gap.

Figure 2:
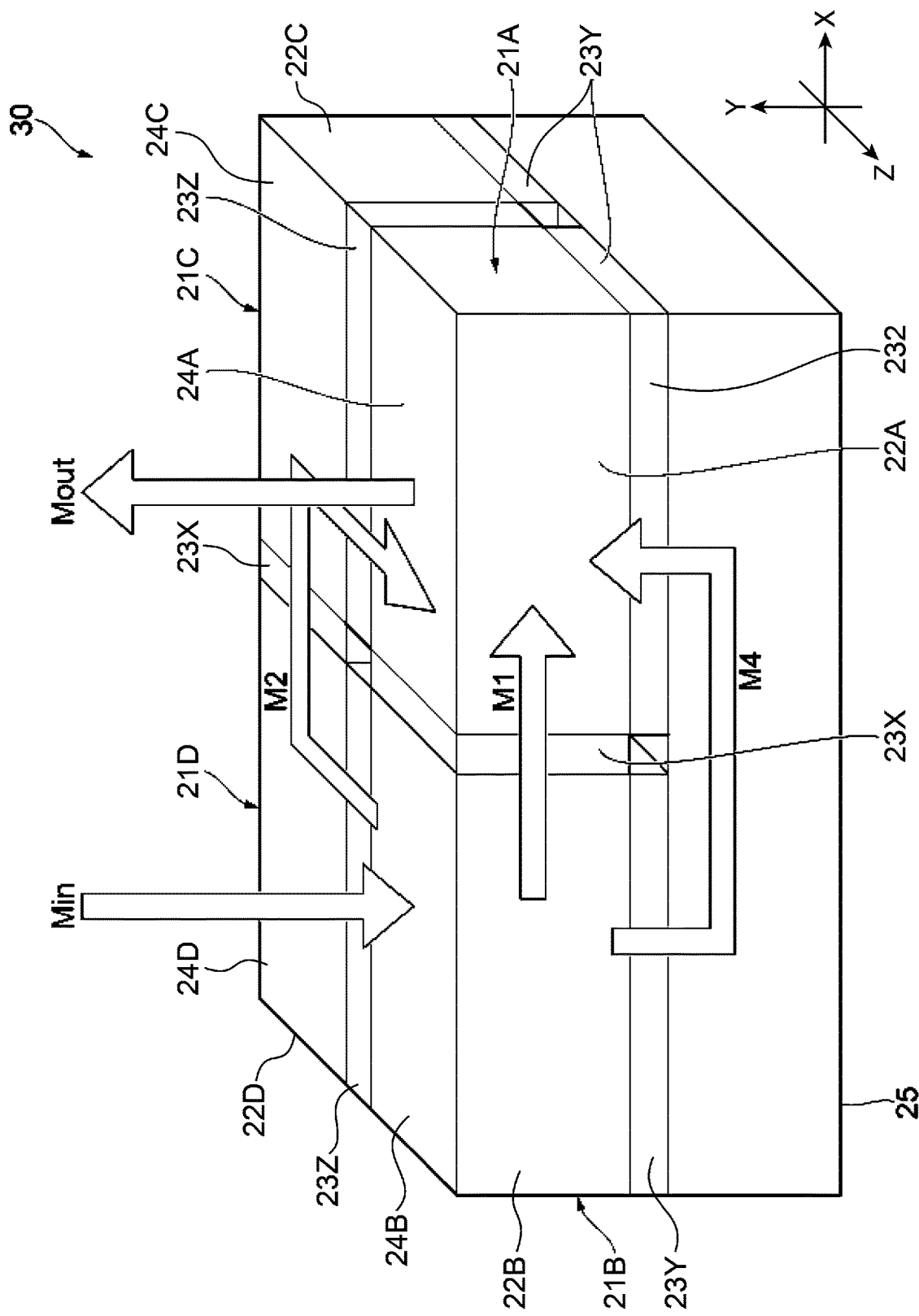
FIG. 2 is a perspective view illustrating a second example of the unit cell.

FIG. 2 is a perspective view of a unit cell 20B. The unit cell 20B is a second example of the unit cell having the three-dimensional magnetic pole structure. As is the case with the unit cell 20A, the X-axis direction, the Y-axis direction, and the Z-axis direction are set for the unit cell 20B. The unit cell 20B may be driven only in a single drive direction or driven in both of two drive directions by a coil attached to the facing magnetic body (not illustrated). The following description is made for the case where the unit cell 20B is driven only in the Z-axis direction, that is, the unit cell 20B is moved relative to the facing magnetic body only in the Z-axis direction. The unit cell 20B may be configured to be driven also in the X-axis direction in addition to the Z-axis direction.

The unit cell 20B includes the first to fourth magnetic pole blocks 21A to 21D. The first magnetic pole block 21A is adjacent to the second magnetic pole block 21B and the third magnetic pole block 21C respectively in the X-axis direction and the Z-axis direction. The fourth magnetic pole block 21D is adjacent to the second magnetic pole block 21B and the third magnetic pole block 21C respectively in the Z-axis direction and the X-axis direction.

The unit cell 20B and the unit cell 20A are different in that the unit cell 20B further includes a back yoke 25. The back yoke 25 is disposed so as to increase the magnetic flux generated in a facing surface. The facing surface is a surface that faces the facing magnetic body in the opposing direction (Y-axis direction). Specifically, the back yoke 25 is formed of a magnetic material and mounted on the plurality of back surface permanent magnets 23Y such that the back yoke 25 is in contact with the opposite surface (lower surface in FIG. 2) from the first to fourth iron cores 22A to 22D with the plurality of back surface permanent magnets 23Y interposed therebetween so as to facilitate the magnetic flux flowing between the plurality of back surface permanent magnets 23Y which are each disposed on a corresponding one of the first to fourth back surfaces of the corresponding first to fourth iron cores 22A to 22D.

Since the first to fourth magnetic pole blocks 21A to 21D are respectively equivalent to the first to fourth magnetic pole blocks 21A to 21D in the unit cell 20A, the same elements are denoted by the same numerals to omit the description of the same elements.

Also in the unit cell 20B, three magnetic paths for the magnetic pole blocks adjacent to each other out of the first to fourth magnetic pole blocks 21A to 21D are provided. For example, a first magnetic path, a second magnetic path, and a third magnetic path as follows are formed as magnetic paths from entering the second magnetic pole blocks 21B as indicated by an arrow Min of FIG. 2 to exiting the first magnetic pole block 21A as indicated by an arrow Mout of FIG. 2. As indicated by an arrow M1 of FIG. 2, the first magnetic path enters the first magnetic pole block 21A from the second magnetic pole block 21B through the second interposition permanent magnet 23X between the first iron core 22A included in the first magnetic pole block 21A and the second iron core 22B included in the second magnetic pole block 21B. As indicated by an arrow M2 of FIG. 2, the second magnetic path enters the fourth magnetic pole block 21D from the second magnetic pole block 21B through the first interposition permanent magnet 23Z between the second iron core 22B and the fourth iron core 22D included in the fourth magnetic pole block 21D, enters the third magnetic pole block 21C from the fourth magnetic pole block 21D through the second interposition permanent magnet 23X between the third iron core 22C included in the third magnetic pole block 21C and the fourth iron core 22D, and enters the first magnetic pole block 21A from the third magnetic pole block 21C through the first interposition permanent magnet 23Z between the first iron core 22A and the third iron core 22C. As indicated by an arrow M4 of FIG. 2, the third magnetic path exits the second magnetic pole block 21B through the back surface permanent magnet 23Y disposed on the second back surface of the second iron core 22B out of the plurality of permanent magnets, passes through the back yoke 25, and enters the first magnetic pole block 21A through the back surface permanent magnet 23Y disposed on the first back surface of the first iron core 22A. As described above, the back yoke 25 is disposed so as to short-circuit the magnetic path in the unit cell 20B.

In the case of application to an electric motor, a plurality of unit cells 20B are arranged in the drive direction. Specifically, the plurality of unit cells 20B are disposed such that different magnetic poles out of the magnetic poles respectively formed by the first to fourth magnetic pole blocks 21A to 21D are alternately arranged in the drive direction, that is, the north pole and the south pole are alternately arranged. For example, even when the drive direction is only a single direction (the Z-axis direction), it is preferable that at least a pair of the north pole and the south pole be disposed in each of the drive direction and a direction perpendicular to the drive direction. The reason for this is that, with a configuration in which a plurality of magnetic poles are arranged only in a single direction, the number of paths through which the magnetic flux flows in and out is small and the amount of generated magnetic flux is small, and accordingly, high performance of the electric motor cannot be obtained.

Figure 3:
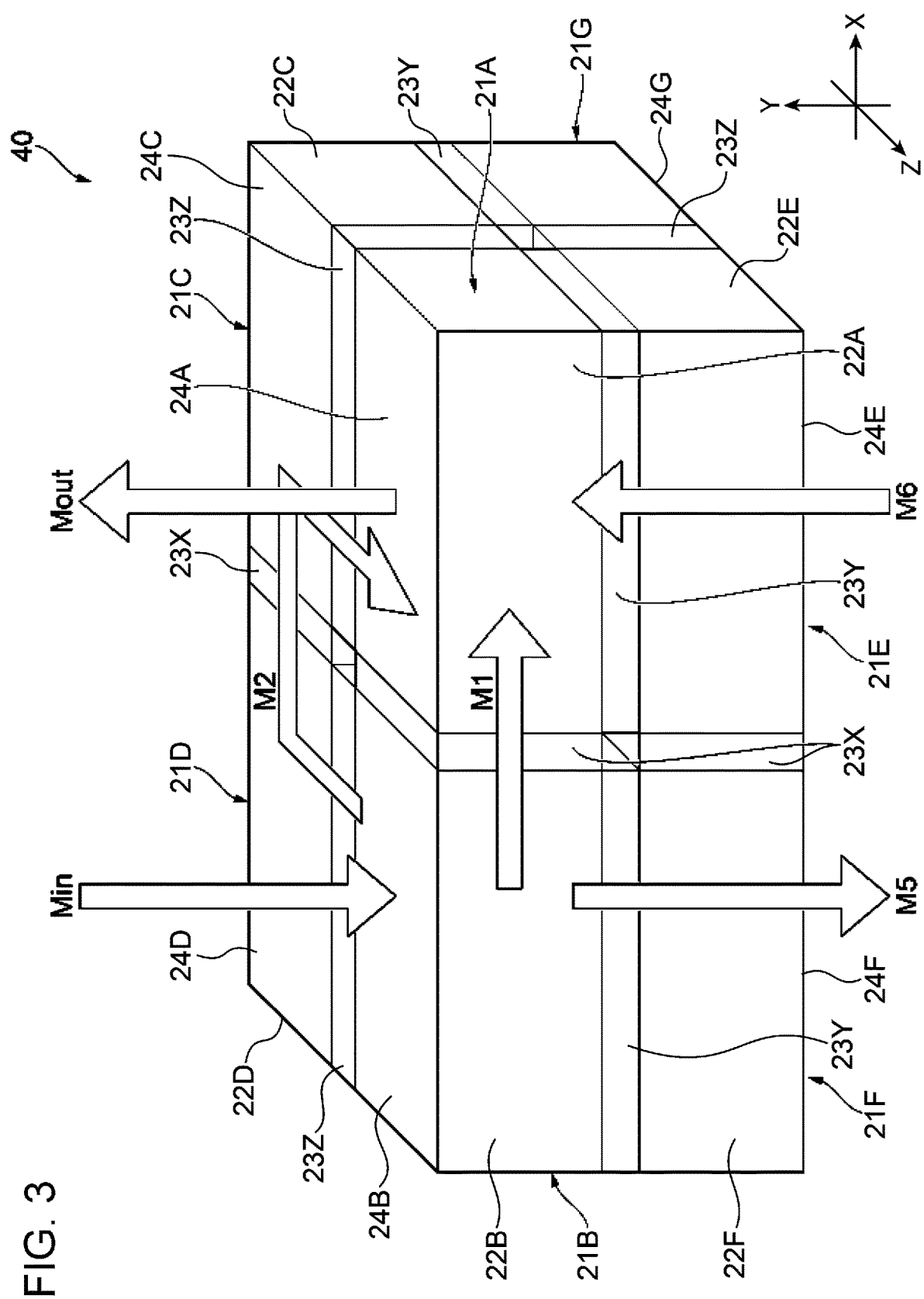
FIG. 3 is a perspective view illustrating a third example of the unit cell.

FIG. 3 is a perspective view of a unit cell 20C. The unit cell is a third example of the unit cell having the three-dimensional magnetic pole structure. The X-axis direction, the Y-axis direction, and the Z-axis direction are set also for the unit cell 20C. As is the case with the unit cell 20B, the unit cell 20C may be driven only in a single drive direction or driven in both of two drive directions by the coil attached to the facing magnetic body (not illustrated). The following description is made for the case where the unit cell 20C is driven only in the Z-axis direction, that is, the unit cell 20C is moved relative to the facing magnetic body only in the Z-axis direction. However, the unit cell 20C may be driven also in the X-axis direction in addition to the Z-axis direction.

The unit cell 20C includes the first to fourth magnetic pole blocks 21A to 21D. The first magnetic pole block 21A is adjacent to the second magnetic pole block 21B and the third magnetic pole block 21C respectively in the X-axis direction and the Z-axis direction. The fourth magnetic pole block 21D is adjacent to the second magnetic pole block 21B and the third magnetic pole block 21C respectively in the Z-axis direction and the X-axis direction.

The unit cells 20A, 20B and the unit cell 20C are different in that the unit cell 20C includes a fifth magnetic pole block 21E, a sixth magnetic pole block 21F, a seventh magnetic pole block 21G, and an eighth magnetic pole block (not illustrated) in addition to the first to fourth magnetic pole blocks 21A to 21D. The fifth magnetic pole block 21E includes a fifth iron core 22E formed of a magnetic material, the sixth magnetic pole block 21F includes a sixth iron core 22F formed of a magnetic material, the seventh magnetic pole block 21G includes a seventh iron core 22H formed of a magnetic material, and the eighth magnetic pole block includes an eighth iron core (not illustrated) formed of a magnetic material. The fifth magnetic pole block 21E is adjacent to the sixth magnetic pole block 21F and the seventh magnetic pole block 21G respectively in the X-axis direction and the Z-axis direction respectively through the second interposition permanent magnet 23X and the first interposition permanent magnet 23Z. The eighth magnetic pole block is adjacent to the sixth magnetic pole block 21F and the seventh magnetic pole block 21G respectively in the Z-axis direction and the X-axis direction respectively through the first interposition permanent magnet 23Z and the second interposition permanent magnet 23X. Furthermore, the fifth magnetic pole block 21E is adjacent to the first magnetic pole block 21A in the Y-axis direction through the back surface permanent magnet 23Y. The sixth magnetic pole block 21F is adjacent to the second magnetic pole block 21B in the Y-axis direction through the back surface permanent magnet 23Y. The seventh magnetic pole block 21G is adjacent to the third magnetic pole block 21C in the Y-axis direction through the back surface permanent magnet 23Y. The eighth magnetic pole block is adjacent to the fourth magnetic pole block 21D in the Y-axis direction through the back surface permanent magnet (not illustrated). The fifth iron core 22E has a fifth magnetic pole surface that forms a fifth magnetic pole, the sixth iron core 22F has a sixth magnetic pole surface that forms a sixth magnetic pole, the seventh iron core 22G has a seventh magnetic pole surface that forms a seventh magnetic pole, and the eighth iron core has an eighth magnetic pole surface that forms an eighth magnetic pole.

Since the first to fourth magnetic pole blocks 21A to 21D are equivalent to the first to fourth magnetic pole blocks 21A to 21D in the unit cell 20A, the same elements are denoted by the same numerals to omit the description of the same elements. Furthermore, since the fifth to seventh magnetic pole blocks 21E to 21G and the eighth magnetic pole block are respectively equivalent to the first to fourth magnetic pole blocks 21A to 21D, the same elements are denoted by the same numerals to omit the description of the same elements. As is the case with the unit cell 20A, the second interposition permanent magnet 23X is polarized in the X-axis direction, the back surface permanent magnets 23Y is polarized in the Y-axis direction, and the first interposition permanent magnet 23Z is polarized in the Z-axis direction.

Also in the unit cell 20C, a plurality of magnetic paths for each of the magnetic pole blocks adjacent to each other out of the first to eighth magnetic pole blocks are formed. For example, a first magnetic path, a second magnetic path, and a third magnetic path as follows are formed as magnetic paths from entering the second magnetic pole blocks 21B as indicated by an arrow Min of FIG. 3 to exiting the first magnetic pole block 21A as indicated by an arrow Mout of FIG. 3. As indicated by an arrow M1 of FIG. 3, the first magnetic path enters the first magnetic pole block 21A from the second magnetic pole block 21B through the second interposition permanent magnet 23X between the first iron core 22A included in the first magnetic pole block 21A and the second iron core 22B included in the second magnetic pole block 21B. As indicated by an arrow M2 of FIG. 3, the second magnetic path enters the fourth magnetic pole block 21D from the second magnetic pole block 21B through the first interposition permanent magnet 23Z between the second iron core 22B and the fourth iron core 22D included in the fourth magnetic pole block 21D, enters the third magnetic pole block 21C from the fourth magnetic pole block 21D through the second interposition permanent magnet 23X between the third iron core 22C included in the third magnetic pole block 21C and the fourth iron core 22D, and enters the first magnetic pole block 21A from the third magnetic pole block 21C through the first interposition permanent magnet 23Z between the first iron core 22A and the third iron core 22C. The third magnetic path enters the sixth magnetic pole block 21F through the back surface permanent magnet 23Y disposed on the second back surface of the second iron core 22B as indicated by an arrow M5 of FIG. 3, exits the sixth magnetic pole block 21F and, as indicated by an arrow M6, enters the fifth magnetic pole block 21C and enters the first magnetic pole block 21A through the back surface permanent magnet 23Y disposed on the first back surface of the first iron core 22A.

When a plurality of unit cells 20C are arranged in the drive direction, a magnetic pole element of the electric motor can be configured. For example, when the plurality of unit cells 20C are arranged straightly along the drive direction, a magnetic pole element of a linear motor can be configured, and when the plurality of unit cell 20C are arranged in an annular shape, a magnetic pole element of a radial gap motor can be configured.

Furthermore, with the unit cell 20C, for example, a double-gap motor described in Japanese Unexamined Patent Application Publication No. 2010-98929 can be configured. In this case, the unit cell 20C is disposed in a rotor of the double-gap motor in a specific state. The specific state refers to a state in which, for example, the Y-axis direction of the unit cell 20C is coincident with the rotation axis of the rotor, and the unit cell 20C is deformed into a sector column shape in which an inner portion of the unit cell 20C in the radial direction is removed.

Figure 4:
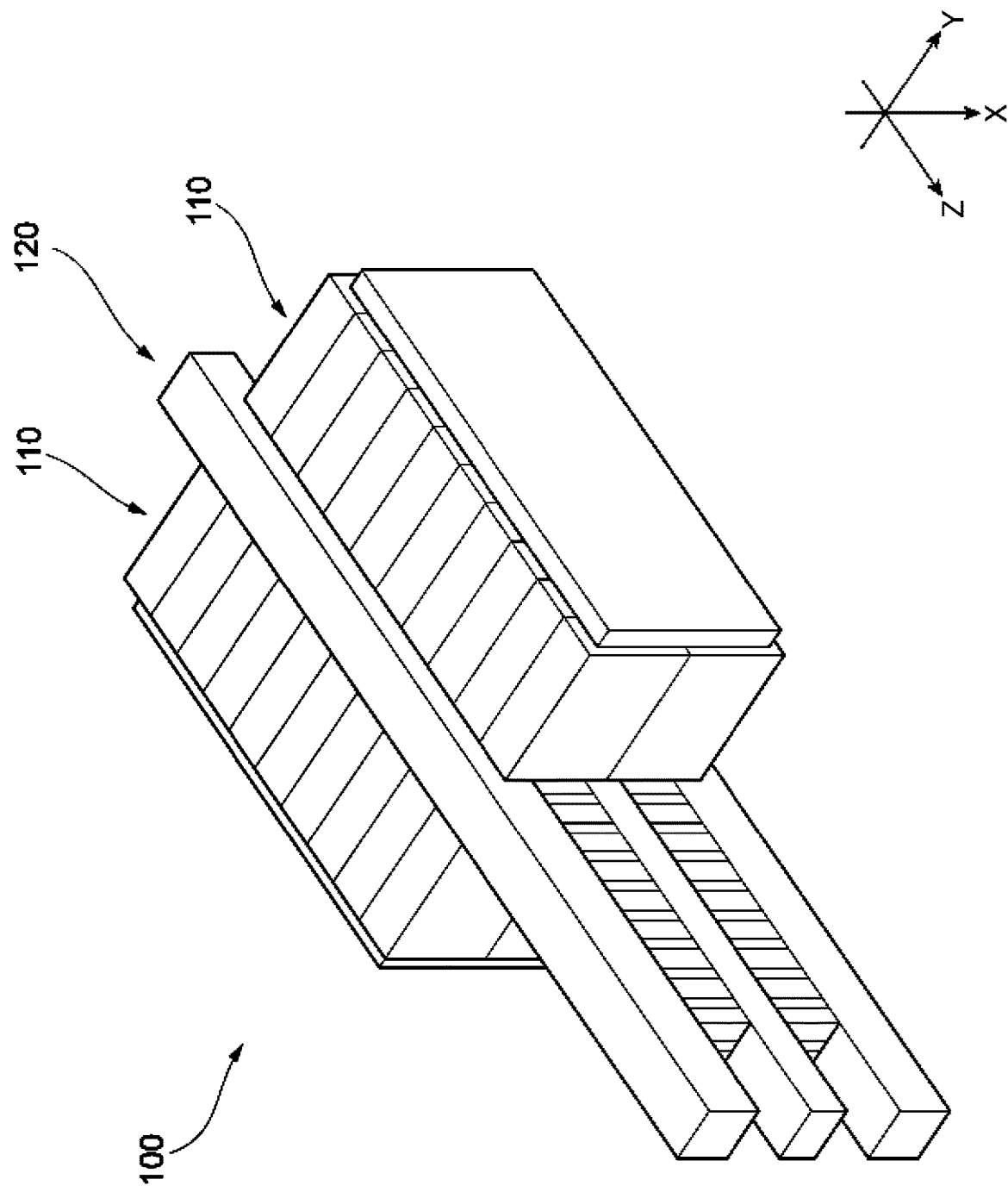
FIG. 4 is a perspective view of a magnetic field generating device and a linear motor including the magnetic field generating device according to a first embodiment of the present invention.

Next, a magnetic field generating device and an electric motor using the magnetic field generating device according to a first embodiment of the present invention will be described with reference to FIGS. 4 to 6 and FIGS. 7A to 7C. The magnetic field generating device according to the present embodiment is applied to a linear motor 100 as illustrated in FIG. 4. The linear motor 100 is a so-called dual-side linear motor and includes a magnetic pole element 120 and a pair of armatures 110. The magnetic pole element 120 includes a plurality of magnetic pole blocks arranged in a predetermined drive direction. The plurality of magnetic pole blocks respectively form a plurality of magnetic poles that are reversed in an alternating manner in the drive direction. The pair of armatures 110 are disposed such that the magnetic pole element 120 is interposed between the pair of armatures 110 in the left-right direction.

The pair of armatures 110 form a magnetic field for linearly moving the magnetic pole element 120 relative to the pair of armatures 110 in the drive direction. The magnetic pole element 120 may be a movable element and the pair of armatures 110 may be stators, or the pair of armatures 110 may be movable elements and the magnetic pole element 120 may be a stator. The following description is made for the case where the magnetic pole element 120 is a movable element and the pair of armatures 110 are stators. The description includes an X-axis direction, a Y-axis direction, and a Z-axis direction respectively correspond to the X-axis direction, the Y-axis direction, and the Z-axis direction indicated in FIGS. 1 to 3. The X-axis direction, the Y-axis direction, and the Z-axis direction respectively correspond to a second arrangement direction, an opposing direction, and a first arrangement direction, which will be described in detail later, and the drive direction of the magnetic pole element 120 is coincident with the first arrangement direction (Z-axis direction).

Figure 5A:
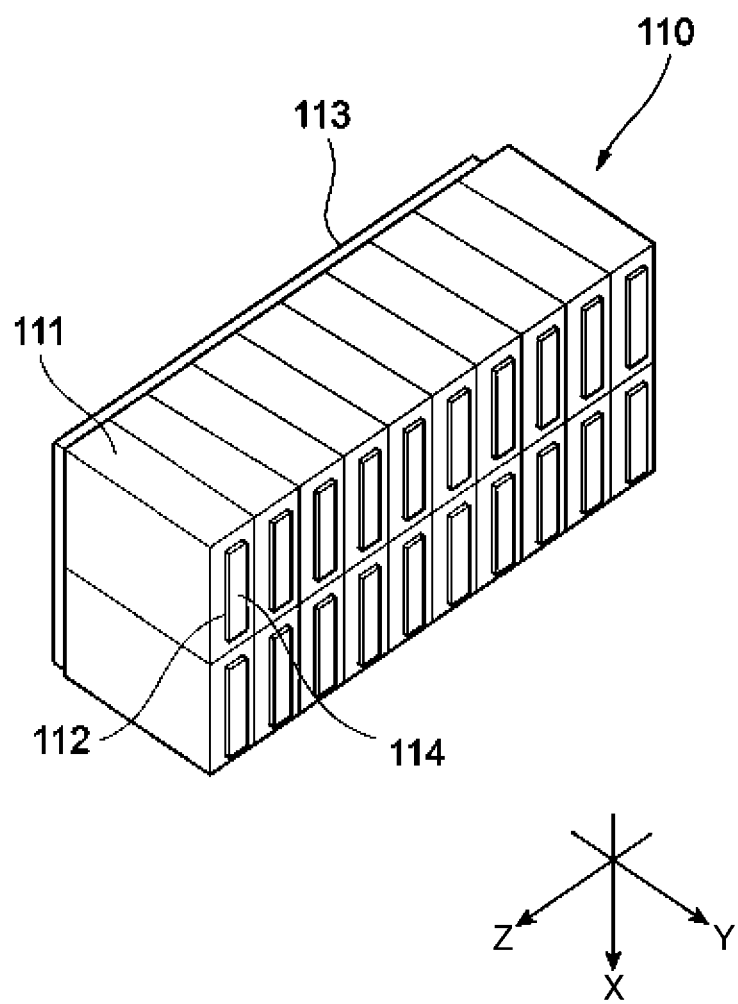
FIG. 5A is a perspective view of an armature of the linear motor.

FIG. 5A is a perspective view illustrating an armature 110 out of the pair of armatures 110 positioned on the left side of the magnetic pole element 120. The armature 110 includes a plurality of armature coils 111 and a magnetic body portion, that is, an armature iron core 115 illustrated FIG. 5B. The armature iron core 115 is an example of the "facing magnetic body" of the magnetic field generating device according to the present invention and integrally includes a plurality of tooth portions 112 and a yoke portion 113. Each of the plurality of tooth portions 112 is included in a coil iron core. The yoke portion 113 has a flat plate shape. The plurality of tooth portions 112 project from a right surface being one of side surfaces of the yoke portion 113 (left surface of the armature 110 positioned on the right side of the magnetic pole element 120) toward the magnetic pole element 120 in the opposing direction (Y-axis direction). The plurality of tooth portions 112 are arranged in the Z-axis direction at each of an upper stage and a lower stage arranged in the X-axis direction. Each of the plurality of armature iron cores 115 is configured with a soft magnetic body such as soft iron or soft ferrite.

Figure 5B:
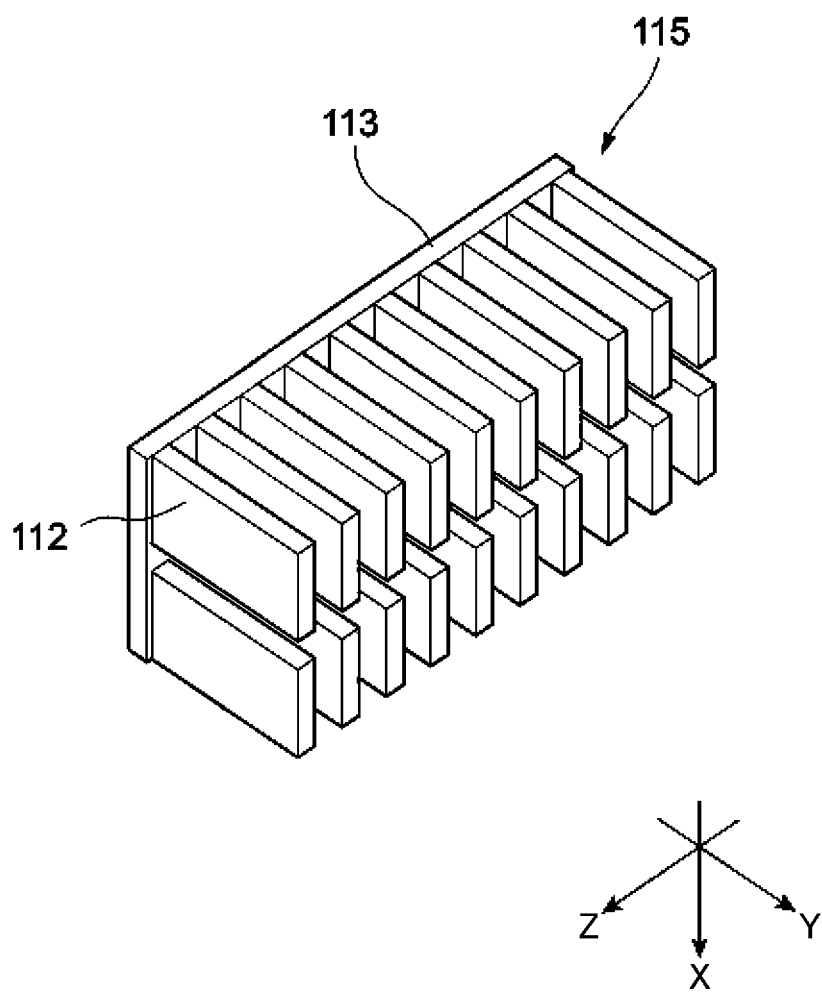
FIG. 5B is a perspective view of a plurality of armature iron cores and an armature back yoke of the linear motor illustrated in FIG. 5A.

Each of the plurality of tooth portions 112 has, for example, a rectangular parallelepiped shape as illustrated in FIG. 5B. The plurality of armature coils 111 are respectively attached to the plurality of tooth portions 112 and form a magnetic field that moves the magnetic pole element 120 relative to the armature iron core 115 in the drive direction (Z-axis direction). Specifically, each of the plurality of armature coils 111 includes a conductor that is wound around a corresponding one of the plurality of tooth portions 112. The total number of the plurality of armature coils 111 according to the present embodiment is 20, and out of these, ten armature coils 111 and other ten armature coils 111 are respectively arranged at each of the upper stage and the lower stage.

Figure 6:
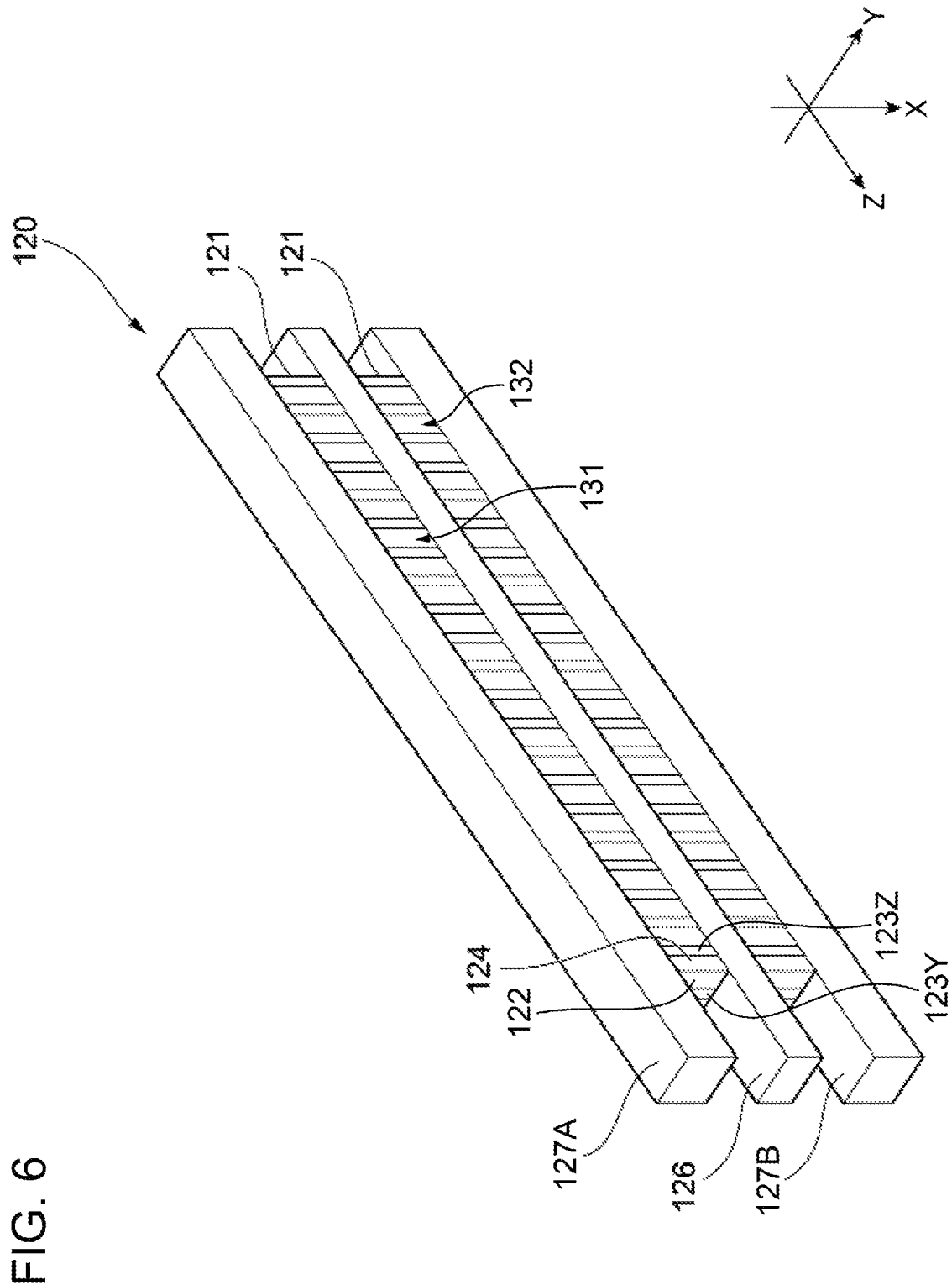
FIG. 6 is a perspective view of a magnetic pole element of the linear motor illustrated in FIG. 4.

As illustrated in FIG. 4, the magnetic pole element 120 is disposed between the pair of armatures 110. FIG. 6 is a perspective view of the magnetic pole element 120. As illustrated in FIG. 6, the magnetic pole element 120 includes a plurality of magnetic pole blocks 121 and a plurality of support members. The plurality of support members include an inner support member 126, a first outer support member 127A, and a second outer support member 127B. Each of the plurality of support members is configured with a non-magnetic material.

Out of the plurality of magnetic pole blocks 121, eight magnetic pole blocks 121 adjacent to each other in the X-axis direction, the Y-axis direction, and the Z-axis direction respectively correspond to the first to eighth magnetic pole blocks illustrated in FIG. 3 and form a unit cell that is closely analogous to the unit cell 20C illustrated in FIG. 3. In other words, the magnetic pole element 120 includes a plurality of unit cells that are each closely analogous to the unit cell 20C, and the plurality of unit cells are supported by the plurality of support members while being arranged in the drive direction (Z-axis direction).

More specifically, the plurality of magnetic pole blocks 121 include a plurality of magnetic element iron cores 122 and a plurality of permanent magnets, and the plurality of magnetic element iron cores 122 are arranged along an arrangement plane perpendicular to the opposing direction (Y-axis direction), that is, a flat plane extending in the X-axis direction and the Z-axis direction.

Figure 7A:
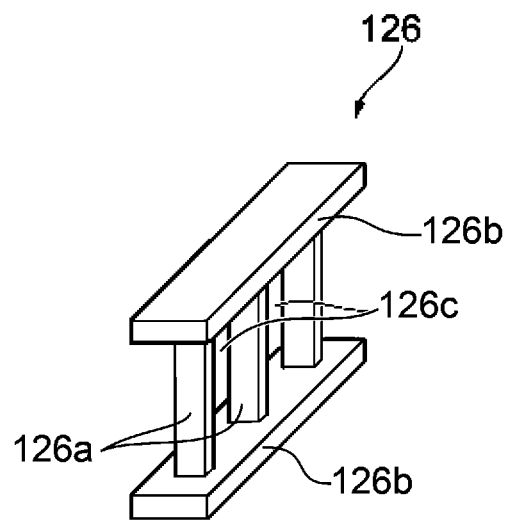
FIG. 7A is a perspective view of an inner support member which is an inner support member according to the first embodiment and with which the magnetic pole element illustrated in FIG. 6 can be configured.
Figure 7B:
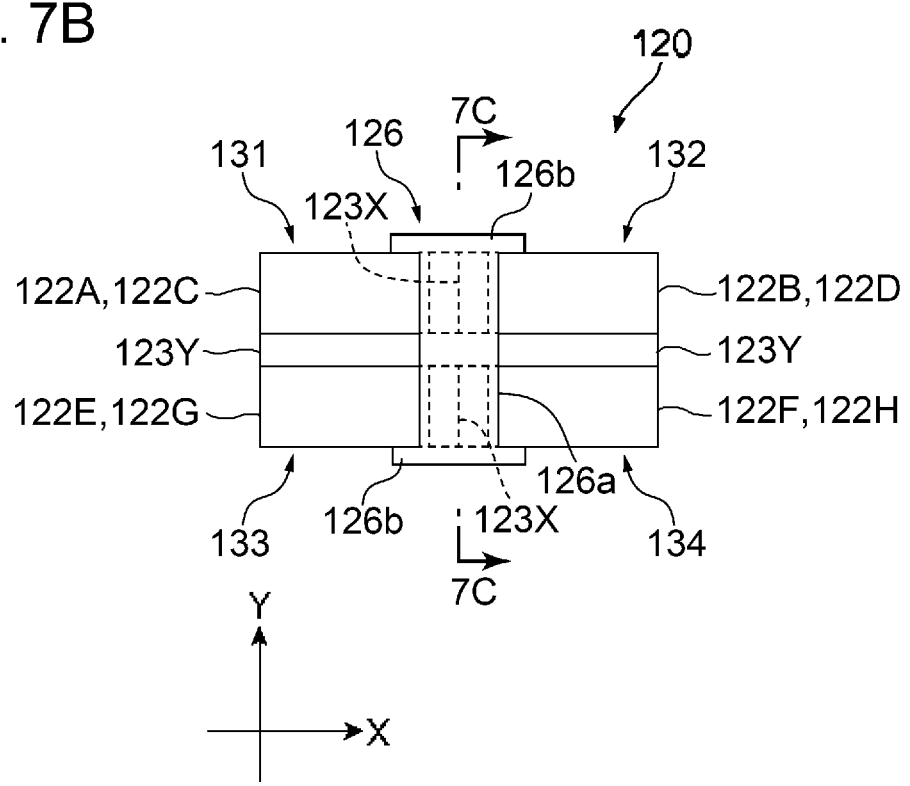
FIG. 7B is a side view illustrating the inner support member illustrated in FIG. 7A and magnetic pole element iron cores and permanent magnets supported by the inner support member.

The plurality of magnetic element iron cores 122 include a plurality of first iron cores 122A, a plurality of second iron cores 122B, a plurality of third iron cores 122C, a plurality of fourth iron cores 122D, a plurality of fifth iron cores 122E, a plurality of sixth iron cores 122F, a plurality of seventh iron cores 122G, and a plurality of eighth iron cores 122H illustrated in FIG. 7B. The plurality of first to eighth iron cores 122A to 122H respectively correspond to the first to seventh iron cores 22A to 22G and eighth iron core illustrated in FIG. 3.

The plurality of first iron cores 122A and the plurality of third iron cores 122C are disposed so as to be alternately arranged along the first arrangement direction (Z-axis direction) along the arrangement plane, thereby forming a first iron core row 131. The plurality of second iron cores 122B and the plurality of fourth iron cores 122D are disposed so as to be alternately arranged along the first arrangement direction, thereby forming a second iron core row 132. Likewise, the plurality of fifth iron cores 122E and the plurality of seventh iron cores 122G are disposed so as to be alternately arranged along the first arrangement direction, thereby forming a third iron core row 133, and the plurality of sixth iron cores 122F and the plurality of eighth iron cores 122H are disposed so as to be alternately arranged along the first arrangement direction, thereby forming a fourth iron core row 134.

The plurality of first iron cores 122A are respectively adjacent to the plurality of second iron cores 122B in the second arrangement direction (X-axis direction). The second arrangement direction is a direction extending along the arrangement plane and perpendicular to the first arrangement direction (Z-axis direction). The plurality of third iron cores 122C are respectively adjacent to the plurality of fourth iron cores 122D in the second arrangement direction-axis. Likewise, the plurality of fifth iron cores 122E are respectively adjacent to the plurality of sixth iron cores 122F in the second arrangement direction, and the plurality of seventh iron cores 122G are respectively adjacent to the plurality of eighth iron cores 122H in the second arrangement direction-axis.

Each of the plurality of first iron cores 122A has a first magnetic pole surface and a first back surface. The first magnetic pole surface is a surface facing, in the opposing direction (Y-axis direction), the magnetic pole element 120 on the right side out of the pair of armatures 110 (surface facing upward in FIG. 7B) and has a first magnetic pole. The first back surface is a surface facing the opposite side from the first magnetic pole surface (lower side in FIG. 7B) in the opposing direction.

Each of the plurality of second iron cores 122B has a second magnetic pole surface and a second back surface. The second magnetic pole surface is a surface facing, in the opposing direction (Y-axis direction), the magnetic pole element 120 on the right side out of the pair of armatures 110 (surface facing upward in FIG. 7B) and has a second magnetic pole. The second back surface is a surface facing the opposite side from the second magnetic pole surface (lower side in FIG. 7B) in the opposing direction.

Each of the plurality of third iron cores 122C has a third magnetic pole surface and a third back surface. The third magnetic pole surface is a surface facing, in the opposing direction (Y-axis direction), the magnetic pole element 120 on the right side out of the pair of armatures 110 (surface facing upward in FIG. 7B) and has a third magnetic pole. The third back surface is a surface facing the opposite side from the third magnetic pole surface (lower side in FIG. 7B) in the opposing direction.

Each of the plurality of fourth iron cores 122D has a fourth magnetic pole surface and a fourth back surface. The fourth magnetic pole surface is a surface facing, in the opposing direction (Y-axis direction), the magnetic pole element 120 on the right side out of the pair of armatures 110 (surface facing upward in FIG. 7B) and has a fourth magnetic pole. The fourth back surface is a surface facing the opposite side from the fourth magnetic pole surface (lower side in FIG. 7B) in the opposing direction.

Each of the plurality of fifth iron cores 122E has a fifth magnetic pole surface and a fifth back surface. The fifth magnetic pole surface is a surface facing, in the opposing direction (Y-axis direction), the magnetic pole element 120 on the left side out of the pair of armatures 110 (surface facing downward in FIG. 7B) and has a fifth magnetic pole. The fifth back surface is a surface facing the opposite side from the fifth magnetic pole surface (upper side in FIG. 7B) in the opposing direction.

Each of the plurality of sixth iron cores 122F has a sixth magnetic pole surface and a sixth back surface. The sixth magnetic pole surface is a surface facing, in the opposing direction (Y-axis direction), the magnetic pole element 120 on the left side out of the pair of armatures 110 (surface facing downward in FIG. 7B) and has a sixth magnetic pole. The sixth back surface is a surface facing the opposite side from the sixth magnetic pole surface (upper side in FIG. 7B) in the opposing direction.

Each of the plurality of seventh iron cores 122G has a seventh magnetic pole surface and a seventh back surface. The seventh magnetic pole surface is a surface facing, in the opposing direction (Y-axis direction), the magnetic pole element 120 on the left side out of the pair of armatures 110 (surface facing downward in FIG. 7B) and has a seventh magnetic pole. The seventh back surface is a surface facing the opposite side from the seventh magnetic pole surface (upper side in FIG. 7B) in the opposing direction.

Each of the plurality of eighth iron cores 122H has an eighth magnetic pole surface and an eighth back surface. The eighth magnetic pole surface is a surface facing, in the opposing direction (Y-axis direction), the magnetic pole element 120 on the left side out of the pair of armatures 110 (surface facing downward in FIG. 7B) and has an eighth magnetic pole. The eighth back surface is a surface facing the opposite side from the eighth magnetic pole surface (upper side in FIG. 7B) in the opposing direction.

The magnetic pole of the first magnetic pole and the magnetic pole of the fourth magnetic pole are the same (for example, the north pole or the south pole) and opposite to both the magnetic pole of the second magnetic pole and the magnetic pole of the third magnetic pole. The magnetic pole of the second magnetic pole and the magnetic pole of the third magnetic pole are the same (for example, the south pole or the north pole) and opposite to both the magnetic pole of the first magnetic pole and the magnetic pole of the fourth magnetic pole. Accordingly, in the first iron core row 131, the north pole and the south pole are alternately arranged in the first arrangement direction (drive direction; Z-axis direction), and in the second iron core row 132, the north pole and the south pole are alternately arranged in the first arrangement direction in a state in which the second iron core row 132 is offset with respect to the first iron core row 131 in the first arrangement direction by the distance of a single magnetic pole element iron core.

Likewise, the magnetic pole of the fifth magnetic pole and the magnetic pole of the eighth magnetic pole are the same (for example, the north pole or the south pole) and opposite to both the magnetic pole of the sixth magnetic pole and the magnetic pole of the seventh magnetic pole. The magnetic pole of the sixth magnetic pole and the magnetic pole of the seventh magnetic pole are the same (for example, the south pole or the north pole) and opposite to both the magnetic pole of the fifth magnetic pole and the magnetic pole of the eighth magnetic pole. Accordingly, in the third iron core row 133, the north pole and the south pole are alternately arranged in the first arrangement direction, and in the fourth iron core row 134, the north pole and the south pole are alternately arranged in the first arrangement direction in a state in which the fourth iron core row 134 is offset with respect to the third iron core row 133 in the first arrangement direction by the distance of a single magnetic pole element iron core.

The plurality of permanent magnets include a plurality of back surface permanent magnets 123Y, a plurality of first interposition permanent magnets 123Z, and a plurality of second interposition permanent magnets 123X.

The plurality of back surface permanent magnets 123Y are respectively disposed on the first to eighth back surfaces so as to cover the corresponding one of the first to eighth back surfaces. Specifically, the plurality of back surface permanent magnets 123Y according to the present embodiment are disposed between the magnetic pole element iron cores 122 adjacent to each other in the opposing direction (Y-axis direction) out of the plurality of magnetic element iron cores 122. More specifically, the plurality of back surface permanent magnets 123Y are respectively disposed between the first and fifth iron cores 122A, 122E, between the second and sixth iron cores 122B, 122F, between the third and seventh iron cores 122C, 122G, and between the fourth and eighth iron cores 122D, 122H. In other words, the plurality of back surface permanent magnets 123Y are shared between the magnetic pole blocks 121 adjacent to each other in the opposing direction (Y-axis direction) out of the plurality of magnetic pole blocks 121.

The plurality of first interposition permanent magnets 123Z are respectively interposed between the magnetic pole element iron cores 122 adjacent to each other in the first arrangement direction (drive direction; Z-axis direction) out of the plurality of magnetic element iron cores 122. Specifically, the plurality of first interposition permanent magnets 123Z are respectively disposed between the first and third iron cores 122A, 122C, between the second and fourth iron cores 122B, 122D, between the fifth and seventh iron cores 122E, 122G, and between the sixth and eighth iron cores 122F, 122H. In other words, the plurality of first interposition permanent magnets 123Z are shared between the magnetic pole blocks 121 adjacent to each other in the first arrangement direction (Z-axis direction) out of the plurality of magnetic pole blocks 121.

The plurality of second interposition permanent magnets 123X are respectively interposed between the magnetic pole element iron cores 122 adjacent to each other in the second arrangement direction (X-axis direction) out of the plurality of magnetic element iron cores 122. Specifically, the plurality of second interposition permanent magnets 123X are respectively disposed between the first and second iron cores 122A, 122B, between the third and fourth iron cores 122C, 122D, between the fifth and sixth iron cores 122E, 122F, and between the seventh and eighth iron cores 122G, 122H. In other words, the plurality of second interposition permanent magnets 123X are shared between the magnetic pole blocks 121 adjacent to each other in the second arrangement direction (X-axis direction) out of the plurality of magnetic pole blocks 121.

The magnetic pole blocks adjacent to each other out of the plurality of magnetic pole blocks 121 that each have a rectangular parallelepiped shape as described above are mutually connected such that a surface of one of the magnetic pole blocks 121 and a surface of the other magnetic pole block 121 are in contact with each other. In each of the opposing direction (Y-axis direction), the first arrangement direction (Z-axis direction), and the second arrangement direction (X-axis direction), the magnetic poles provided in the magnetic pole surfaces (surfaces facing the armature 110) of two magnetic pole element iron cores 122 which are adjacent to each other out of the plurality of magnetic element iron cores 122 are opposite to each other. That is, the plurality of magnetic element iron cores 122 are arranged in two rows in the upper side and the lower side such that the magnetic poles of the magnetic pole surfaces are reversed in an alternating manner in each of the Y-axis direction, the Z-axis direction, and the X-axis direction. Accordingly, one and the other of the connected surfaces of the two magnetic pole blocks 121 adjacent to each other are the south pole and the north pole, respectively. This causes the two magnetic pole blocks 121 adjacent to each other to attract each other with the magnetic forces. Thus, the plurality of magnetic pole blocks 121 can be easily arranged.

When an electric current of an appropriate direction is caused to flow through each of the plurality of armature coils 111 in the linear motor 100 having a configuration as described above, a magnetic field is generated around each of the plurality of armature coils 111. At this time, facing surfaces of the plurality of tooth portions 112, that is, surfaces facing the magnetic pole element 120 serve as armature magnetic pole surfaces 114. The armature magnetic pole surfaces 114 and a magnetic pole element magnetic pole surfaces 124 attract each other or repel each other with the magnetic forces. Accordingly, when the current flowing through the armature coils 111 is controlled so as to change the magnetic fields generated by the plurality of armature coils 111, the magnetic pole element 120 can be moved relative to the pair of armatures 110 in the first arrangement direction (Z-axis direction).

The inner support member 126 is positioned between the first iron core row 131 and the second iron core row 132 and between the third iron core row 133 and the fourth iron core row 134. The inner support member 126 extends in the first arrangement direction (drive direction; Z-axis direction) and, in the second arrangement direction (X-axis direction) perpendicular to the first arrangement direction, supports the plurality of first iron cores 122A, the plurality of third iron cores 122C, the plurality of fifth iron cores 122E, and the plurality of seventh iron cores 122G on one side (upper side in FIGS. 4 and 6) of the inner support member 126 and, at the same time, supports the plurality of second iron cores 122B, the plurality of fourth iron cores 122D, the plurality of sixth iron cores 122F, and the plurality of eighth iron cores 122H on the other side (lower side in FIGS. 4 and 6).

Figure 7C:
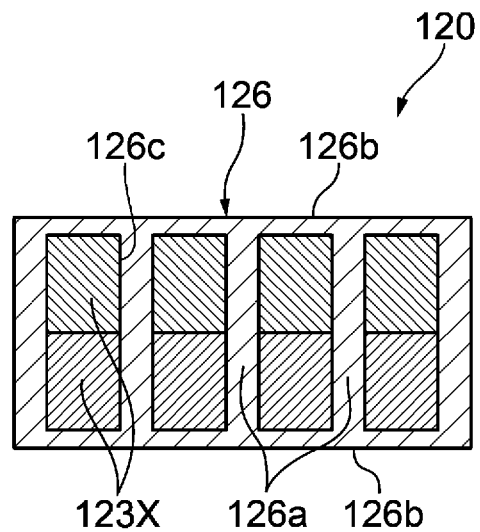
FIG. 7C is a plan view illustrating a section taken along line 7C-7C of FIG. 7B.

FIG. 7A is a perspective view of the inner support member 126. FIGS. 7B and 7C are respectively a side view and a sectional plan view (a plan view illustrating a section taken along line 7C-7C of FIG. 7B) of the magnetic pole element 120 including the inner support member 126. The inner support member 126 integrally includes a plurality of inner support member main bodies 126a and a pair of edge portions 126b. The plurality of inner support member main bodies 126a are arranged in communicating spaces 126c in the first arrangement direction (Z-axis direction), and each of the plurality of inner support member main bodies 126a extends in the opposing direction (Y-axis direction). The pair of edge portions 126b are disposed in the opposing direction (Y-axis direction) with a space interposed therebetween, and each of the edge portions 126b extends in the first arrangement direction (Z-axis direction). Both end portions of each of the plurality of the inner support member main bodies 126a in the Y-axis direction are respectively integrally connected to the pair of edge portions 126B.

Accordingly, the inner support member 126 has a ladder shape that defines a plurality of the communicating spaces 126c as illustrated in FIG. 7A, and the plurality of communicating spaces 126c are arranged in the first arrangement direction (Z-axis direction). Each of the plurality of communicating spaces 126c allows a space on one side (upper side in FIG. 6) of the inner support member 126 and a space on the other side (lower side in FIG. 6) of the inner support member 126 to communicate with each other in the second arrangement direction (X-axis direction). For convenience, the numbers of the communicating spaces 126c in FIGS. 7A and 7C are respectively two and four. However, the number of the communicating spaces 126c is not limited. In the inner support members 126 exemplified in FIGS. 4 and 6, many (for example, ten or more of the) inner support member main bodies 126a and the communicating spaces 126c are alternately arranged in the first arrangement direction (Z-axis direction).

The plurality of communicating spaces 126c allows, in the communicating spaces 126c, the plurality of second interposition permanent magnets 123X to be respectively interposed between the magnetic pole element iron cores 122 adjacent to each other in the second arrangement direction (X-axis direction) out of the plurality of magnetic element iron cores 122. Specifically, as illustrated in FIG. 7B, two of the second interposition permanent magnets 123X are contained in each of the plurality of the communicating spaces 126c. One of the two second interposition permanent magnets 123X is interposed between the magnetic pole element iron core 122 included in the first iron core row 131 (the first iron core 122A or the third iron core 122C) and the magnetic pole element iron core 122 included in the second iron core row 132 (the second iron core 122B or the fourth iron core 122D). The other of the two second interposition permanent magnets 123X is interposed between the magnetic pole element iron core 122 included in the third iron core row 133 (the fifth iron core 122E or the seventh iron core 122G) and the magnetic pole element iron core 122 included in the fourth iron core row 134 (the sixth iron core 122F or the eighth iron core 122H).

As illustrated in FIG. 7B, end portions of the magnetic pole element iron cores 122 disposed on both sides of each of the plurality of second interposition permanent magnets 123X are fitted into the corresponding communicating spaces 126c from both outside portions (both the left and right sides in FIG. 7B) in the second arrangement direction (X-axis direction). Specifically, in an orientation illustrated in FIGS. 4 and 6, lower end portions (right end portions in FIG. 7B) of the first, third, fifth, and seventh iron cores 122A, 122C, 122E, and 122G and upper end portions (left end portions in FIG. 7B) of the second, fourth, sixth, and eighth iron cores 122B, 122D, 122F, 122H are inserted into the communicating spaces 126c and in contact with the second interposition permanent magnets 123X.

The inner support member 126 can efficiently support the plurality of magnetic element iron cores 122 with a simple structure while allowing each of the plurality of magnetic element iron cores 122 to be arranged in the first arrangement direction (Z-axis direction) on both sides in the second arrangement direction (X-axis direction). Furthermore, the plurality of communicating spaces 126c formed in the inner support member 126 allow, in the communicating spaces 126c, the second interposition permanent magnets 123X to be interposed between the magnetic pole element iron cores 122 adjacent to each other in the second arrangement direction (Y-axis direction). The pair of edge portions 126B have projection portions that project to both sides in the second arrangement direction (X-axis direction) from the plurality of inner support member main bodies 126a. The projection portions restrain at least parts of the plurality of first interposition permanent magnets 123Z and the plurality of magnetic element iron cores 122 from extending outward in the second arrangement direction from the inner support member 126.

The first outer support member 127A is disposed on the opposite side (upper side in FIG. 6) from the inner support member 126 with the first and third iron core rows 131 and 133 interposed therebetween in the second arrangement direction (X-axis direction) and supports the magnetic pole element iron cores 122 included in the first and third iron core rows 131 and 133 between the inner support member 126 and the first outer support member 127A. Likewise, the second outer support member 127B is disposed on the opposite side (lower side in FIG. 6) from the inner support member 126 with the second and fourth iron core rows 132 and 134 interposed therebetween in the second arrangement direction and supports the magnetic pole element iron cores 122 included in the second and fourth iron core rows 132 and 134 between the inner support member 126 and the second outer support member 127B.

Each of the plurality of magnetic element iron cores 122 can be secured to the inner support member 126, the first outer support member 127A, and the second outer support member 127B by bonding, screwing, or another means. Alternatively, the first and second outer support members 127A and 127B can be omitted. In this case, the inner support member 126 alone can support the plurality of magnetic elements on its both sides, that is, the both sides in the second arrangement direction.

Figure 8A:
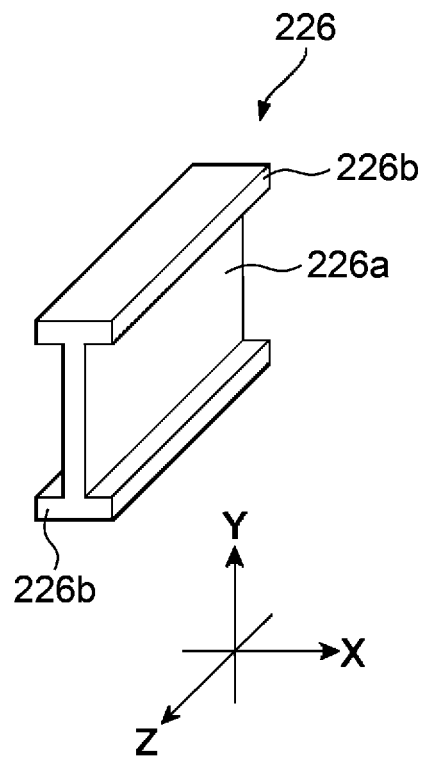
FIG. 8A is a perspective view of an inner support member which is an inner support member according to the second embodiment of the present invention and with which the magnetic pole element illustrated in FIG. 6 can be configured.
Figure 8B:
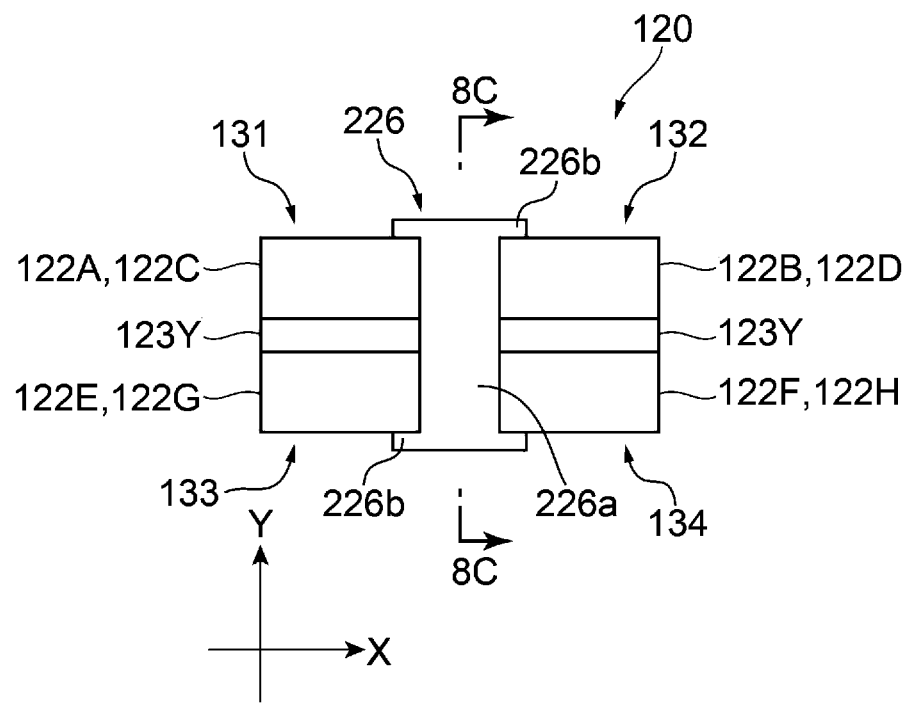
FIG. 8B is a side view illustrating the inner support member illustrated in FIG. 8A and the magnetic pole element iron cores and the permanent magnets supported by the inner support member.
Figure 8C:
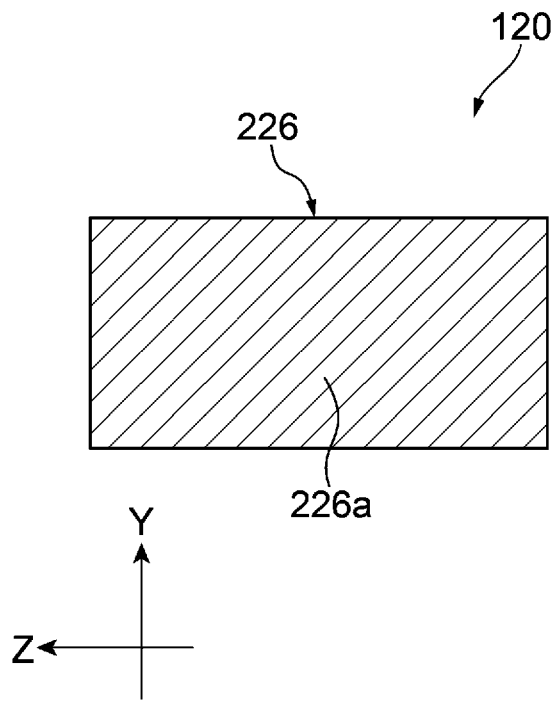
FIG. 8C is a plan view illustrating a section taken along line 8C-8C of FIG. 8B.

FIG. 8A is a perspective view illustrating an inner support member 226 according to a second embodiment of the present invention. FIG. 8B is a side view of the magnetic pole element 120 including the inner support member 226. FIG. 8C is a plan view illustrating a section taken along line 8C-8C of FIG. 8B. With the inner support member 226, the magnetic pole element 120 illustrated in FIG. 6 can also be configured.

The inner support member 226 is different from the inner support member 126 in that the inner support member 226 includes a single inner support member main body 226a instead of the plurality of inner support member main bodies 126a of the inner support member 126 illustrated in FIG. 7A. The single inner support member main body 226a continuously extends in an entire region in the first arrangement direction (Z-axis direction). Accordingly, unlike the inner support member 126 according to the first embodiment, the inner support member 226 does not define the plurality of communicating spaces 126c. The inner support member main body 226a of the inner support member 226 is continuously interposed between the magnetic pole element iron cores 122 included in the first and third iron core rows 131,133 and the magnetic pole element iron cores 122 included in the second and fourth iron core rows 132, 134 in the entire region in the first arrangement direction. In more detail, an inner end portion of each of the plurality of magnetic pole element iron cores 122 (an end portion facing the inner support member 226) is supported by the inner support member 226 in a state in which the inner end portion is caused to abut the inner support member main body 226a from both sides in the second arrangement direction (X-axis direction). Accordingly, in the magnetic pole element 120 including the inner support member 226, the plurality of second interposition permanent magnets 123X are replaced with a portion included in the inner support member main body 226a of the inner support member 226.

As is the case with the inner support member 126 illustrated in FIGS. 7A to 7C, the inner support member 226 further includes a pair of edge portions 226b in addition to the inner support member main bodies 226a. The pair of edge portions 226b is connected to both end portions of the inner support member main body 226a in the opposing direction (Y-axis direction) so as to form a continuous section (H-shaped section) together with the inner support member main body 226a.

Unlike the magnetic pole element according to the first embodiment in which permanent magnets are present in all the three-dimensional magnetic paths formed in the magnetic pole element 120, in the linear motor 100 including the inner support member 226, the second interposition permanent magnets 123X which are a subset of the permanent magnets are absent. Accordingly, the amount of magnetic flux formed in the linear motor 100 is small compared to that of the first embodiment. However, despite the absence of the second interposition permanent magnets 123X as described above, the three-dimensional magnetic paths can be formed. Accordingly, an effect that allows efficient formation of a large amount of magnetic flux compared to the related-art magnetic pole element can be produced. Accordingly, with the magnetic pole element 120 including the inner support member 226 according to the second embodiment, both the effect that allows efficient formation of a large amount of magnetic flux and the effect that allows ensuring of high strength and stiffness of the magnetic pole element 120 can be produced. The inner support member 226 according to the second embodiment described above is effective for the case where high strength and stiffness are required for the magnetic pole element 120.

For example, the inner support member 126 according to the first embodiment allows realization of a structure in which the plurality of permanent magnets 123Y, 123Z, and 123X surround each of the plurality of magnetic pole element iron cores 122 in all of the Y-axis direction, Z-axis direction, and the X-axis direction. However, meanwhile, the permanent magnets that are easily cracked or broken are easily subjected to forces. Furthermore, the inner support member 126 needs to hold the plurality of magnetic pole element iron cores 122 and the plurality of permanent magnets 123Y, 123Z, and 123X while ensuring the communicating space 126c for allowing the second interposition permanent magnet 123X to be interposed. Thus, it is difficult to ensure high strength and high stiffness of the inner support member 126. Furthermore, the shape of the inner support member 126 is limited to a complex shape (for example, the ladder shape), and accordingly, the degree difficulty of the manufacture of the inner support member 126 is high.

Furthermore, variations of the plurality of second interposition permanent magnets 123X in the thickness dimension cause variations of the dimension of the magnetic pole element 120 in the X-axis direction with respect to the drive direction (Z-axis direction), that is, variations of a magnetic pole period in the drive direction. The variations influence accuracy of control of the electric motor 100. Specifically, when the actual position of the magnetic pole surface and the position of the magnetic pole surface obtained by a sensor are out of phase, synchronization of the phases of the current and the magnetic pole element 120 may be interfered. Furthermore, in the case of a rotary electric motor, concentration of variations of the dimension in a single position may make the magnetic pole element become a Landolt ring shaped magnetic pole element, which may lead to eccentricity. This becomes noticeable as the size of the electric motor increases.

In contrast, in the inner support member 226 illustrated in FIGS. 8A to 8C, the inner support member main body 226a has a solid section (a section having a shape illustrated in FIG. 8A) uniformly in the entire region in the first arrangement direction (Z-axis direction). Accordingly, compared to the first embodiment, the magnetic pole element 120 can have a high strength and stiffness. Furthermore, the inner support member main body 226 can have a plain shape and easily manufactured.

The direction in which the magnetic pole element 120 is moved relative to the pair of armatures 110 (drive direction) may be only the first arrangement direction (Z-axis direction) or two directions which are the first arrangement direction and the second arrangement direction (X-axis direction).

Furthermore, at least a subset of the first interposition permanent magnets 123Z may be omitted in addition to the absence of the plurality of second interposition permanent magnets 123X. That is, at least a subset of the plurality of first interposition permanent magnets 123Z may be replaced with part of the inner support member, and this part may be interposed between the magnetic pole element iron cores 122 adjacent to each other in the first arrangement direction (Z-axis direction). With this, even when a large thrust is applied to the magnetic pole element 120 in the drive direction, that is, the first arrangement direction (Z-axis direction), the magnetic pole element 120 can have a strength with which the magnetic pole element 120 can resist the thrust.

Figure 9A:
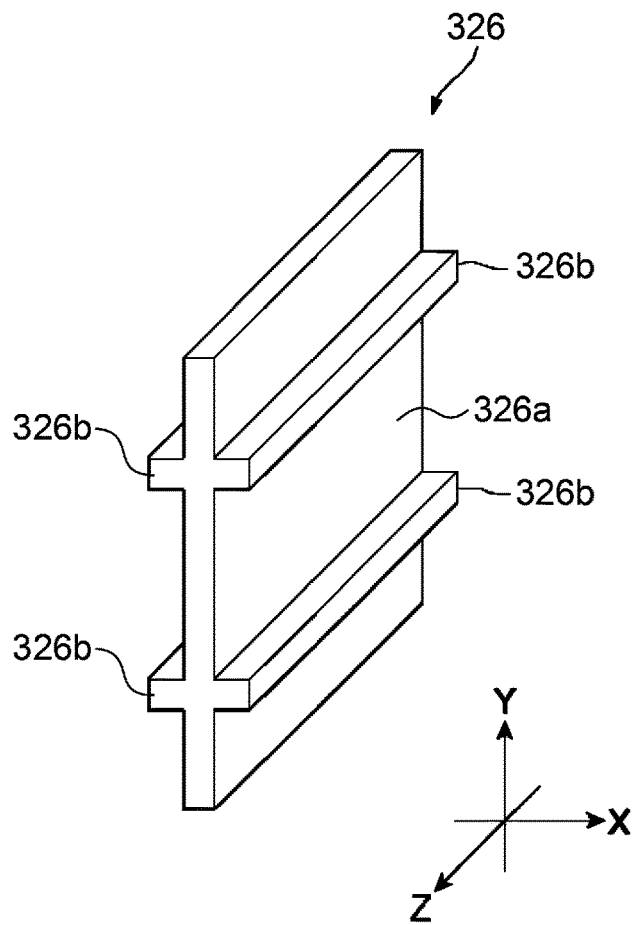
FIG. 9A is a perspective view of an inner support member which is an inner support member according to a third embodiment of the present invention and with which the magnetic pole element illustrated in FIG. 6 can be configured.
Figure 9B:
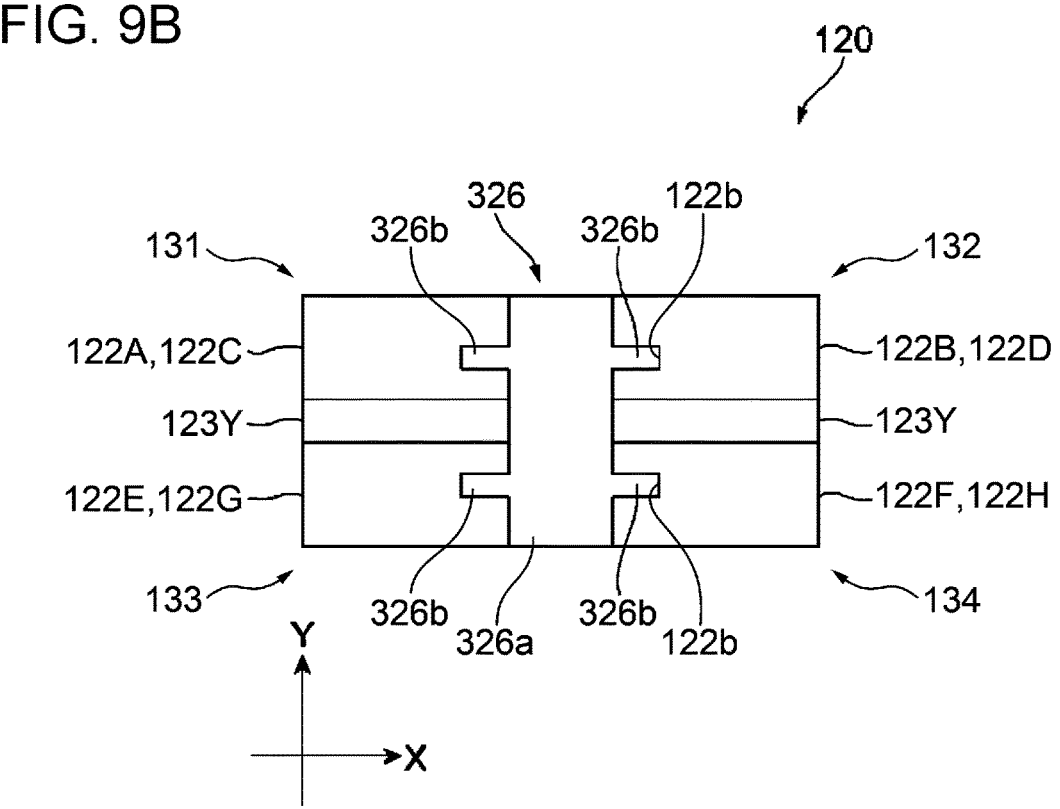
FIG. 9B is a side view illustrating the inner support member illustrated in FIG. 9A and the magnetic pole element iron cores and the permanent magnets supported by the inner support member.

FIG. 9A is a perspective view illustrating an inner support member 326 according to a third embodiment of the present invention. FIG. 9B is a side view of the magnetic pole element 120 including the inner support member 326. With the inner support member 326, the magnetic pole element 120 illustrated in FIG. 6 can also be configured.

As illustrated in FIG. 9A, the inner support member 326 includes a single inner support member main body 326a and a plurality of projection portions 326b. As is the case with the inner support member main body 326a illustrated in FIG. 8A, the inner support member main body 326a continuously extends in an entire region in the first arrangement direction (drive direction; Z-axis direction). In the inner support member main body 326a, the plurality of projection portions 326b project from both surfaces (left/right side surfaces in FIGS. 9A and 9B, upper/lower surfaces in the orientation illustrated in FIG. 6) that face in the second arrangement direction (X-axis direction). The plurality of projection portions 326b respectively project toward the first to fourth iron core rows 131 to 134 in the second arrangement direction. Each of the projection portions 326b may continuously extend in the entire region in the first arrangement direction as is the case with the inner support member main body 326a as illustrated in FIG. 9A or may include a plurality of projections respectively correspond to the plurality of magnetic element iron cores.

Meanwhile, a recessed portion 122b is formed in each of the plurality of magnetic pole element iron cores included in the first to fourth iron core rows 131 to 134. The recessed portion 122b is formed in a surface facing the inner support member main body 326a in the second arrangement direction (X-axis direction) out of the outer surfaces of each of the magnetic pole element iron cores and has a shape that receives the projection portion 326b. The recessed portion 122b is recessed in a separating direction from the inner support member main body 326a along the second arrangement direction (X-axis direction) so as to allow the projection portion 326b to be fitted into the recessed portion 122b. According to the present embodiment, recessed portions (not illustrated) that receive the projection portions 326b as is the case with the recessed portions 122b are formed also in the first interposition permanent magnets 123Z in addition to the magnetic pole element iron cores 122.

When the plurality of projection portions 326b are fitted into the respective recessed portions 122b of the plurality of magnetic element iron cores 122, joining strength of the plurality of magnetic element iron cores 122 to the inner support member 326 can be improved. In addition, the surface where the recessed portion 122b is formed (the X-axis surface) is a different surface from a surface that faces in the opposing direction (Y-axis direction) in each of the plurality of magnetic pole element iron cores 122, that is, the magnetic pole surface that is most likely to generate magnetic saturation. Accordingly, an influence of the recessed portion 122b on the magnetic flux formed between the armatures 110 and the magnetic pole element 120 facing the armatures 110 in the opposing direction illustrated in FIG. 4 is small.

Figure 10A:
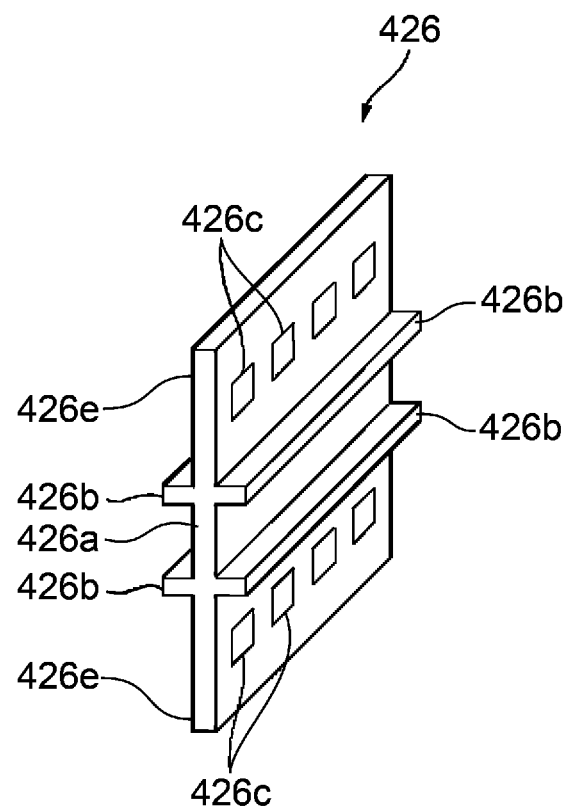
FIG. 10A is a perspective view of an inner support member which is an inner support member according to a fourth embodiment of the present invention and with which the magnetic pole element illustrated in FIG. 6 can be configured.
Figure 10B:
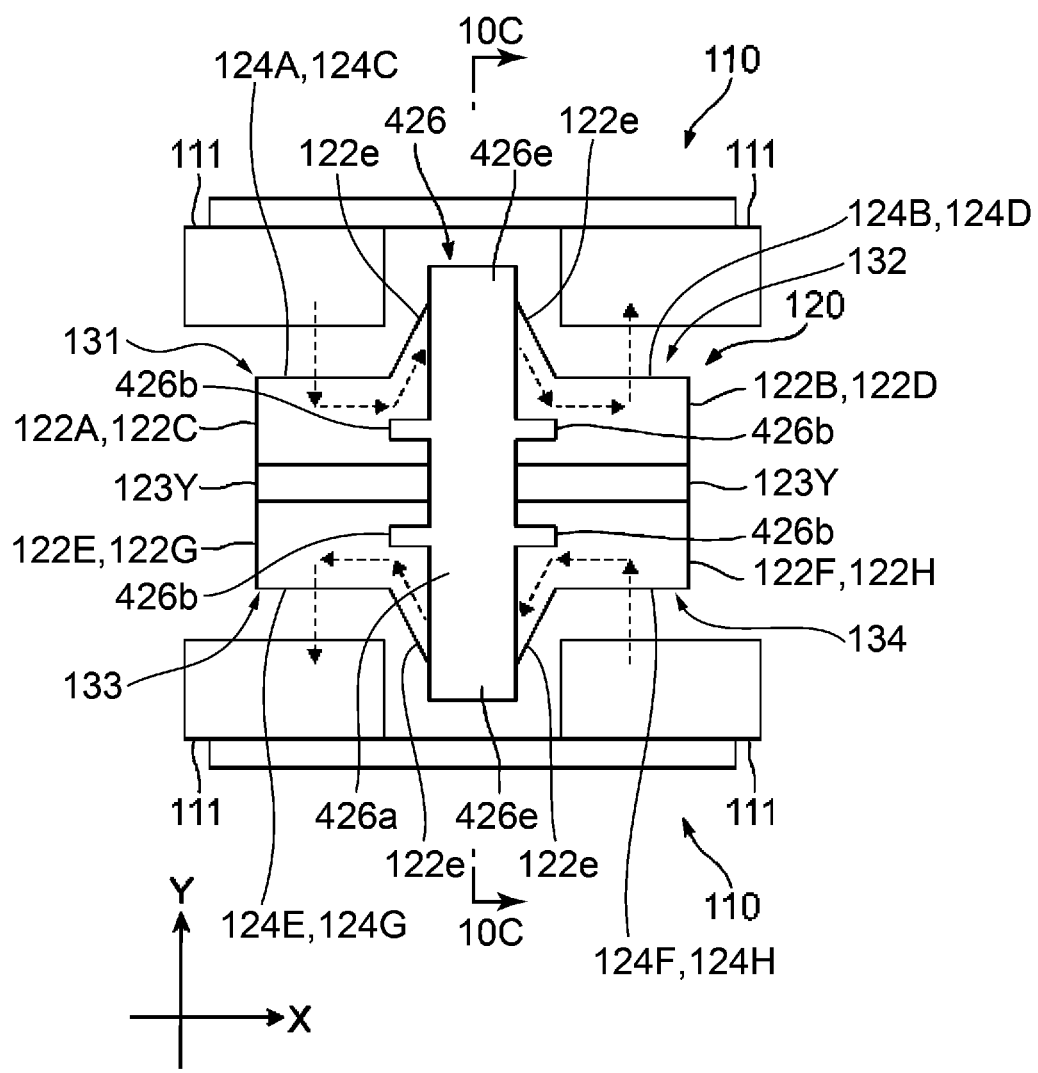
FIG. 10B is a side view illustrating the inner support member illustrated in FIG. 10A and the magnetic pole element iron cores and the permanent magnets supported by the inner support member.
Figure 10C:
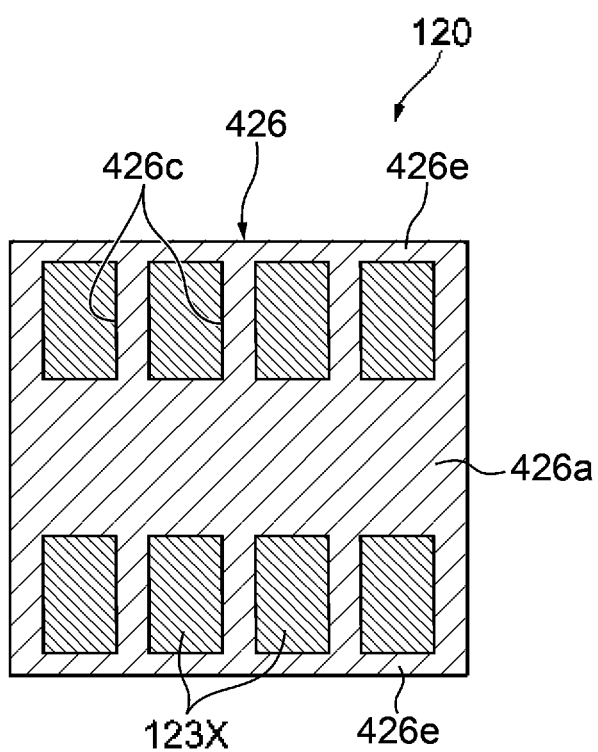
FIG. 10C is a plan view illustrating a section taken along line 10C-10C of FIG. 10B.

FIG. 10A is a perspective view illustrating an inner support member 426 according to a fourth embodiment of the present invention. FIG. 10B is a side view of the magnetic pole element 120 including the inner support member 426 and the pair of armatures 110 facing the magnetic pole element 120. FIG. 10C is a plan view illustrating a section taken along line 10C-10C of FIG. 10B. Although the inner support member 426 includes an inner support member main body 426a and a plurality of projection portions 426b respectively similar to the inner support member main body 326a and the plurality of projection portions 326b of the inner support member 326 illustrated in FIGS. 9A and 9B, the inner support member 426 is different from the inner support member 326 in the following points (a) and (b).

(a) As illustrated in FIG. 10A, the inner support member 426 has a pair of extension portions 426e. The pair of extension portions 426e are portions extended from the inner support member main body 426a in the opposing direction (Y-axis direction) so as to extend toward the pair of armatures 110, respectively, in the opposing direction, extending beyond the magnetic pole surfaces, which are the magnetic pole surfaces of the plurality of first to eighth iron cores 122A to 122H, respectively, that is, first to eighth magnetic pole surfaces 124A to 124H. With the pair of extension portions 426e, the inner support member 426 has a larger sectional area than that of the inner support member 326. Furthermore, as illustrated in FIG. 10B, since the pair of extension portions 426e are disposed at positions between the armature coils 111 arranged in the X-axis direction in each of the pair of armatures 110, interference between the pair of armatures 110 and the magnetic pole element 120 is not caused.

(b) The inner support member 426 has a plurality of communicating spaces 426c arranged in the first arrangement direction (Z-axis direction). As is the case with the communicating space 126c illustrated in FIG. 7C, each of the plurality of communicating spaces 426c allows a space on one side (left side in FIG. 10B) and a space on the other side (right side in FIG. 10B) of the inner support member 426 in the second arrangement direction (X-axis direction) to communicate with each other and allows the second interposition permanent magnet 123X to be incorporated in the communicating space 426c. Thus, the second interposition permanent magnet 123X can be interposed between the magnetic element iron cores adjacent to each other (for example, the first iron core 122A and the second iron core 122B) in the second arrangement direction (X-axis direction) out the plurality of magnetic element iron cores 122.

Each of the plurality of communicating spaces 426c is formed such that at least part of the second interposition permanent magnet 123X is positioned at the extension portions 426e. Specifically, according to the present embodiment, the plurality of communicating spaces 426c are formed such that at least outer portions of the communicating spaces 426c are positioned at the extension portions 426e at positions outside (the upper side and the lower side in FIGS. 10A to 10C) the plurality of projection portions 426b in the opposing direction. This allows the inner support member 426 to have both the plurality of projection portions 426b and the plurality of communicating spaces 426c within a limited space. Furthermore, the pair of extension portions 426e suppress degradation of bending stiffness of the inner support member 426 caused by the formation of the plurality of communicating spaces 426c.

For convenience, only four of the communicating spaces 426c are disclosed in FIGS. 10A and 10C. However, the specific number of the communicating spaces 426c is not limited. For example, five or more communicating spaces 426c may be formed in the inner support member 426.

According to the fourth embodiment, the plurality of magnetic pole element iron cores 122 (first to eighth iron cores 122A to 122H) have respective enlargement portions 122e. The enlargement portions 122e are portions outwardly enlarged in the opposing direction (Y-axis direction) from the magnetic pole surfaces 124 (first to eighth magnetic pole surfaces 124A to 124H) of the magnetic pole element iron cores 122 toward the pair of extension portions 426e in a region near the inner support member main body 426a and the pair of extension portions 426e. The enlargement portions 122e facilitate passage of the magnetic flux generated in the armature coils 111 of the armatures 110 (for example, the armature coil 111 at the upper left in FIG. 10B) through paths (for example, paths indicated by broken line arrows in FIG. 10B) that extend through the second interposition permanent magnets 123X and reach the armature coils 111 on the opposite side in the same armatures 110 (for example, the armature coil 111 at the upper right in FIG. 10B). However, provision of the enlargement portion 122e in each of the magnetic pole element iron cores 122 is optional.

Figure 11A:
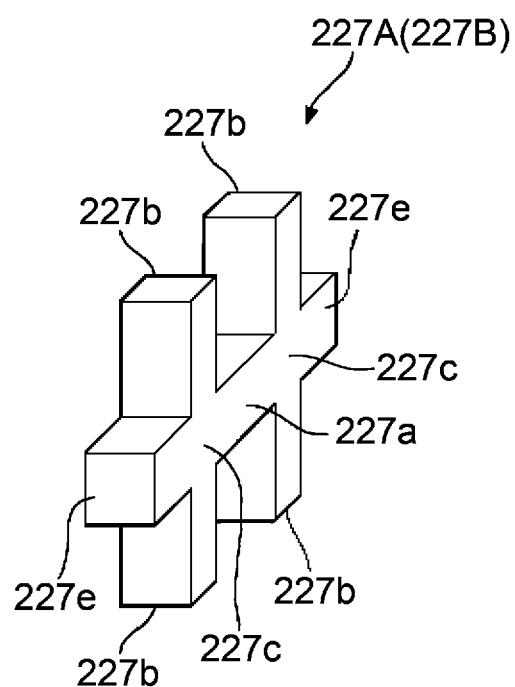
FIG. 11A is a perspective view of a first and second outer support members which are first and second outer support members according to a fifth embodiment of the present invention and with which the magnetic pole element illustrated in FIG. 6 can be configured.
Figure 11B:
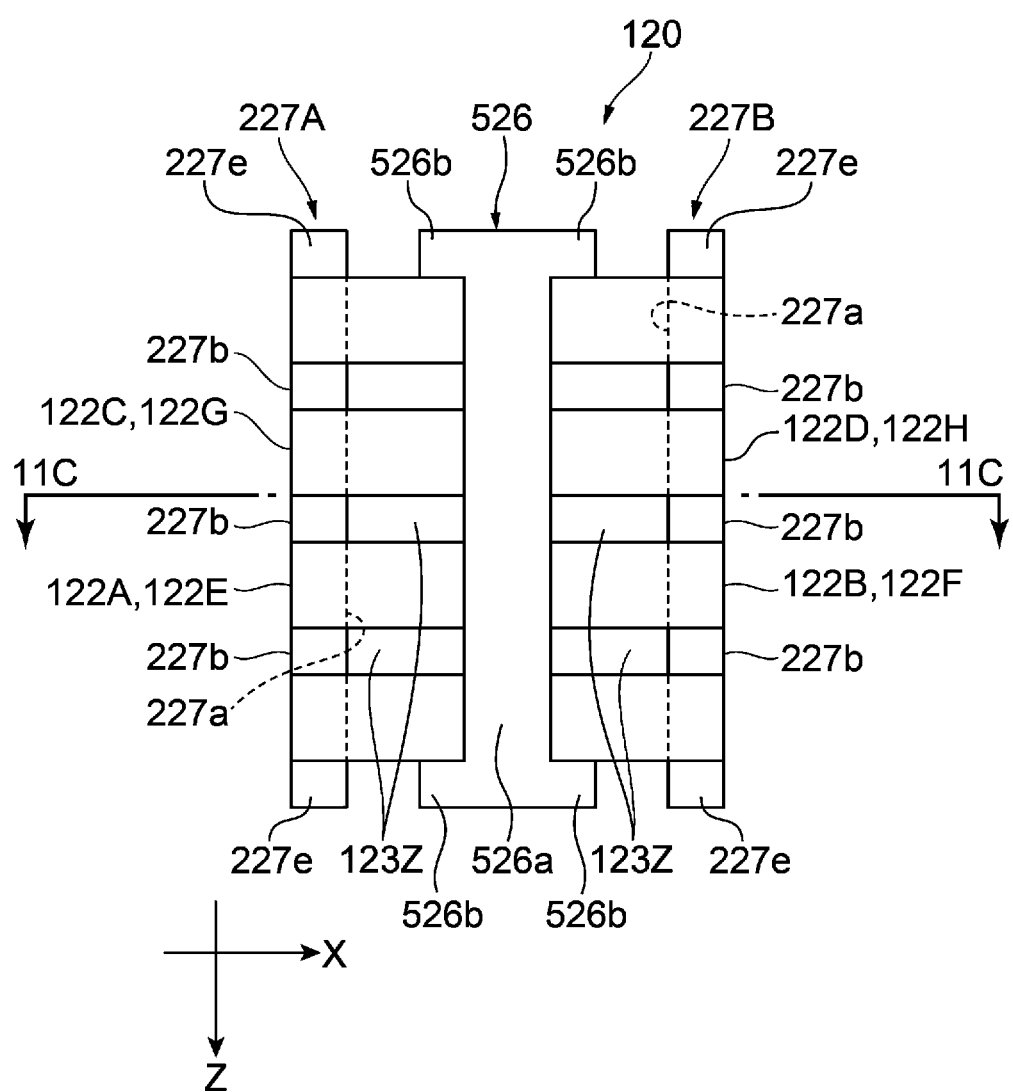
FIG. 11B is a front view of the magnetic pole element including the first and second outer support members illustrated in FIG. 11A.
Figure 11C:
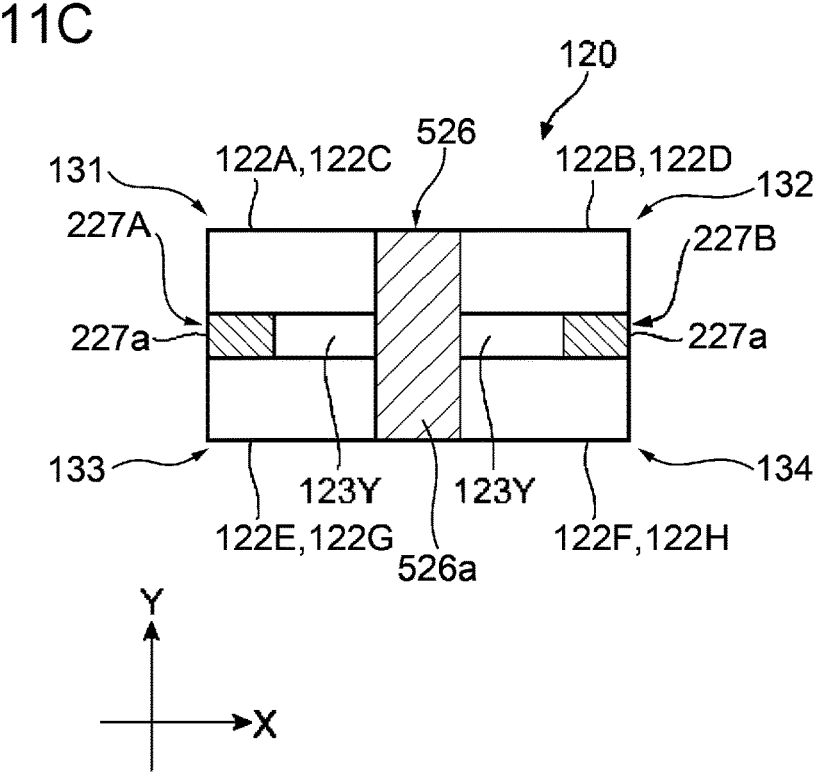
FIG. 11C is a side view illustrating a section taken along line 11C-11C of FIG. 11B.

FIG. 11A is a perspective view illustrating a first outer support member 227A and a second outer support member 227B according to a fifth embodiment of the present invention. FIG. 11B is a front view of the magnetic pole element 120 including the first and second outer support members 227A and 227B. FIG. 11C is a side view illustrating a section taken along line 11C-11C of FIG. 11B. Since the first and second outer support members 227A and 227B have the same shape, they are represented by the common drawing.

This magnetic pole element 120 according to the fifth embodiment includes a plurality of magnetic element iron cores, a plurality of permanent magnets, an inner support member 526, and the first and second outer support members 227A and 227B.

As is the case with the first to fourth embodiments, the plurality of magnetic element iron cores include a plurality of first iron cores 122A, a plurality of second iron cores 122B, a plurality of third iron cores 122C, a plurality of fourth iron cores 122D, a plurality of fifth iron cores 122E, a plurality of sixth iron cores 122F, a plurality of seventh iron cores 122G, and a plurality of eighth iron cores 122H. As is the case with the second embodiment, the plurality of permanent magnets include the plurality of back surface permanent magnets 123Y, and the plurality of first interposition permanent magnets 123Z but do not include the second interposition permanent magnets.

The inner support member 526 includes an inner support member main body 526a and a plurality of projection portions 526b. Similarly to the inner support member main body 226a according to the second embodiment, the inner support member main body 526a continuously extends in an entire region in the first arrangement direction (Z-axis direction) and is interposed between the magnetic pole element iron cores included in the first and third iron core rows 131,133 and the magnetic pole element iron cores included in the second and fourth iron core rows 132, 134 out of the first to eighth iron cores 122A to 122H in the entire region in the first arrangement direction. The plurality of projection portions 526b project to both sides in the second arrangement direction (X-axis direction) perpendicular to the first arrangement direction (Z-axis direction) at both end portions of the inner support member main body 526a in the first arrangement direction so as to constrain each of the first to fourth iron core rows 131 to 134 from both sides in the second arrangement direction.

Unlike the plurality of back surface permanent magnets 123Y and the plurality of first interposition permanent magnets 123Z according to the second embodiment, the plurality of back surface permanent magnets 123Y and the plurality of first interposition permanent magnets 123Z according to the fifth embodiment each have a smaller dimension than the dimension of each of the plurality of magnetic element iron cores in the second arrangement direction (X-axis direction). This dimension setting is aimed at, for example, suppressing variations of the dimensions of the back surface permanent magnets 123Y and the first interposition permanent magnets 123Z in the second arrangement direction and the inconvenience caused by the above-described variations. When the plurality of back surface permanent magnets 123Y and the plurality of first interposition permanent magnets 123Z the dimensions of which are set as described above are caused to abut both surfaces of the inner support member main body 526a in the second arrangement direction (X-axis direction) together with the plurality of magnetic element iron cores, a plurality of spaces respectively interposed between the magnetic pole element iron cores adjacent to each other in the opposing direction (Y-axis direction) and the first arrangement direction (Z-axis direction) are respectively formed outside the plurality of back surface permanent magnets 123Y and outside the plurality of first interposition permanent magnets 123Z in the second arrangement direction (X-axis direction).

Each of the first and second outer support members 227A and 227B has a shape with which at least part of each of the plurality of spaces can be filled. Specifically, as illustrated in FIG. 11A, each of the first and second outer support members 227A and 227B has an outer support member main body 227a and a plurality of interposition filling portions 227b integrated with the outer support member main body 227a.

The outer support member main body 227a continuously extends in an entire region in the first arrangement direction (Z-axis direction). As illustrated in FIG. 11C, the outer support member main body 227a of the first outer support member 227A is disposed so as to fill a first back surface space, and the outer support member main body 227a of the second outer support member 227B is disposed so as to fill a second back surface space. The first back surface space is a space that is formed outside the plurality of back surface permanent magnets 123Y in the second arrangement direction (X-axis direction) between the back surfaces (the first back surface and the third back surface) of the magnetic pole element iron cores (first and third iron cores 122A and 122C) included in the first iron core row 131 and the back surfaces (the fifth back surface and the seventh back surface) of the magnetic pole element iron cores (fifth and seventh iron cores 122E and 122G) included in the third iron core row 133 and that faces the back surfaces. The second back surface space is a space that is formed outside the plurality of back surface permanent magnets 123Y in the second arrangement direction (X-axis direction) between the back surfaces (the second back surface and the fourth back surface) of the magnetic pole element iron cores (second and fourth iron cores 122B and 122D) included in the second iron core row 132 and the back surfaces (the sixth back surface and the eighth back surface) of the magnetic pole element iron cores (sixth and eighth iron cores 122F and 122H) included in the fourth iron core row 134 and that faces the back surfaces.

The plurality of interposition filling portions 227b are portions that outwardly project to both sides in the opposing direction (Y-axis direction) from a plurality of positions intermittently arranged in the first arrangement direction (Z-axis direction) in the outer support member main body 227a. As illustrated in FIG. 11C, the plurality of interposition filling portions 227b of the first outer support members 227A are disposed so as to fill each of a plurality of first interposition spaces and a plurality of third interposition spaces. Likewise, the plurality of interposition filling portions 227b of the second outer support members 227B are disposed so as to fill each of a plurality of second interposition spaces and a plurality of fourth interposition spaces. The plurality of first interposition spaces are spaces outside the plurality of first interposition permanent magnets 123Z, respectively, in the second arrangement direction (X-axis direction) between the magnetic pole element iron cores (first and third iron cores 122A and 122C) adjacent to each other in the first arrangement direction (Z-axis direction) in the first iron core row 131, and the plurality of second interposition spaces are spaces outside the plurality of first interposition permanent magnets 123Z, respectively, in the second arrangement direction (X-axis direction) between the magnetic pole element iron cores (second and fourth iron cores 122B and 122D) adjacent to each other in the first arrangement direction (Z-axis direction) in the second iron core row 132. Likewise, the plurality of third interposition spaces are spaces outside the plurality of first interposition permanent magnets 123Z, respectively, in the second arrangement direction (X-axis direction) between the magnetic pole element iron cores (fifth and seventh iron cores 122E and 122G) adjacent to each other in the first arrangement direction (Z-axis direction) in the third iron core row 133, and the plurality of fourth interposition spaces are spaces outside the plurality of first interposition permanent magnets 123Z, respectively, in the second arrangement direction (X-axis direction) between the magnetic pole element iron cores (sixth and eighth iron cores 122F and 122H) adjacent to each other in the first arrangement direction (Z-axis direction) in the fourth iron core row 134.

Accordingly, a portion of the outer support member main body 227a of the first outer support member 227A except for a plurality of intersection portions 227c and both end portions 227e in the first arrangement direction is included in a first back surface filling portion that fills at least part of the first back surface space. Each of the plurality of intersection portions 227c is a portion where the outer support member main body 227a and the interposition filling portions 227b on both sides of the outer support member main body 227a intersect each other. The first back surface space is a space facing the first and third back surfaces (according to the present embodiment, interposed between the first and third back surfaces and the fifth and seventh back surfaces) at a position outside the back surface permanent magnet 123Y in the second arrangement direction. Likewise, a portion of the outer support member main body 227a of the second outer support member 227B except for the plurality of intersection portions 227c and both the end portions 227e in the first arrangement direction is included in a second back surface filling portion that fills at least part of the second back surface space. The second back surface space is a space facing the second and fourth back surfaces (according to the present embodiment, interposed between the second and fourth back surfaces and the sixth and eighth back surfaces) at a position outside the back surface permanent magnet 123Y in the second arrangement direction. Furthermore, the interposition filling portions 227b that respectively fill the plurality of first interposition spaces out of the plurality of interposition filling portions 227b of the first outer support members 227A correspond to a plurality of first interposition filling portions, and the interposition filling portions 227b that respectively fill the plurality of second interposition spaces out of the plurality of interposition filling portions 227b of the second outer support members 227B correspond to a plurality of second interposition filling portions.

When the first and second back surface filling portions and the first and second interposition filling portions in the first and second outer support members 227A and 227B are disposed so as to respectively fill at least parts of spaces outside the plurality of back surface permanent magnets 123Y and at least parts of spaces outside the plurality of first interposition permanent magnets 123Z, even in the case where both the plurality of back surface permanent magnets 123Y and the plurality of first interposition permanent magnets 123Z have a smaller dimension than the dimension of each of the plurality of magnetic element iron cores in the second arrangement direction as described above, the entirety of the magnetic pole element 120 can have a high strength. That is, even when parts of the plurality of back surface permanent magnets 123Y and the plurality of first interposition permanent magnets 123Z in the second arrangement direction are omitted to avoid the inconvenience caused by the variations of the dimensions of the plurality of back surface permanent magnets 123Y and the plurality of first interposition permanent magnets 123Z in the second arrangement direction, the first and second back surface filling portions and the first and second interposition filling portions respectively fill at least parts of the spaces formed due to the omission, thereby allowing the strength of the entirety of the magnetic pole element 120 to be ensured. Furthermore, the first and second back surface filling portions and the first and second interposition filling portions can suppress displacement of the plurality of back surface permanent magnets 123Y and the plurality of first interposition permanent magnets 123Z to the outside in the second arrangement direction. Even in a different case where a subset or all of the plurality of first interposition permanent magnets 123Z are omitted, the first or second interposition filling portions is interposed between the magnetic pole element iron cores instead. Thus, strength of the entirety of the magnetic pole element 120 can be similarly ensured.

Figure 12A:
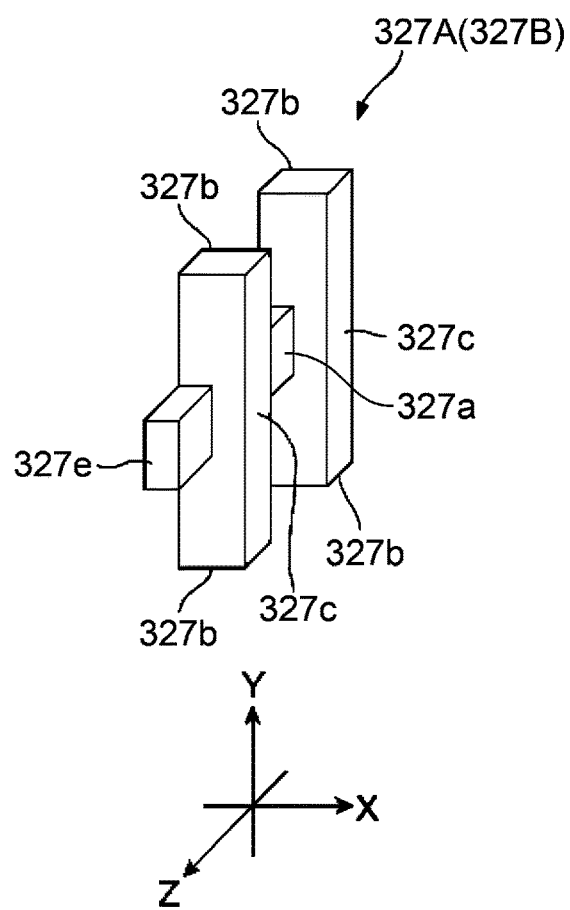
FIG. 12A is a perspective view of a first and second outer support members which are first and second outer support members according to a sixth embodiment of the present invention and with which the magnetic pole element illustrated in FIG. 6 can be configured.
Figure 12B:
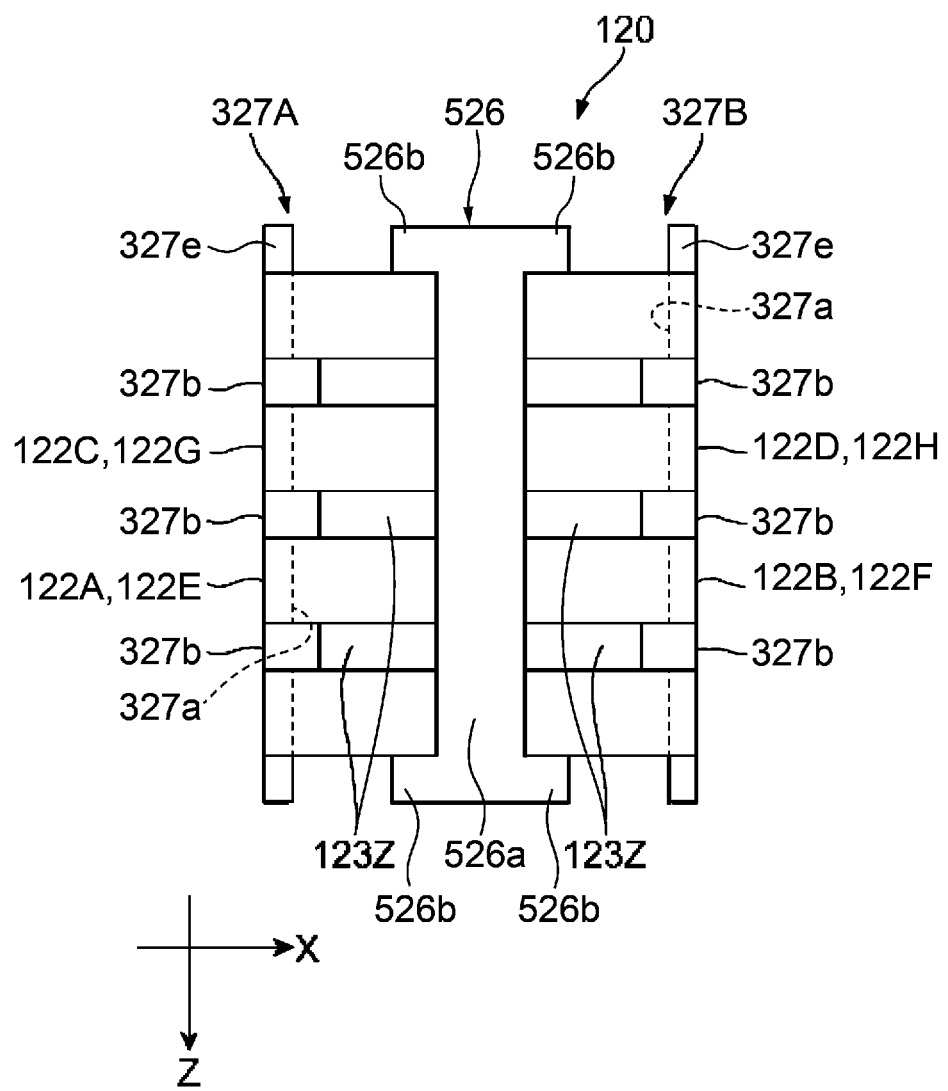
FIG. 12B is a front view of the magnetic pole element including the first and second outer support members illustrated in FIG. 12A.

FIG. 12A is a perspective view illustrating a first outer support member 327A and a second outer support member 327B according to a sixth embodiment of the present invention. FIG. 12B is a front view of the magnetic pole element 120 including the first and second outer support members 327A and 327B. Since the first and second outer support members 327A and 327B have the same shape, they are represented by the common drawing.

Although the first and second outer support members 327A and 327B include an outer support member main body 327a extending in the first arrangement direction (Z-axis direction) and a plurality of interposition filling portions (first interposition filling portions) 327b projecting in the opposing direction (Y-axis direction) from the outer support member main body 327a as is the case with the first and second outer support members 227A and 227B illustrated in FIGS. 11A to 11C, the first and second outer support members 327A and 327B are different from the outer support members 227A and 227B in that portions of the outer support member main body 327a of the first and second outer support members 327A and 327B except for a plurality of intersection portions 327c have a smaller thickness dimension than the thickness dimension of the plurality of interposition filling portions 327b. As is the case with the plurality of intersection portions 227c illustrated in FIG. 11A, each of the plurality of intersection portions 327c is a portion where the outer support member main body 327a and the interposition filling portions 327b on both sides of the outer support member main body 327a intersect each other. The "thickness dimension" refers to the dimension in the second arrangement direction (X-axis direction). The shape of the first and second outer support members 327A and 327B is effective when the degree of reduction of the dimension of the first interposition permanent magnet 123Z in the second arrangement direction (X-axis direction) is greater than that of the back surface permanent magnet 123Y (FIG. 11C) or the first interposition permanent magnets 123Z themselves are omitted.

Figure 13A:
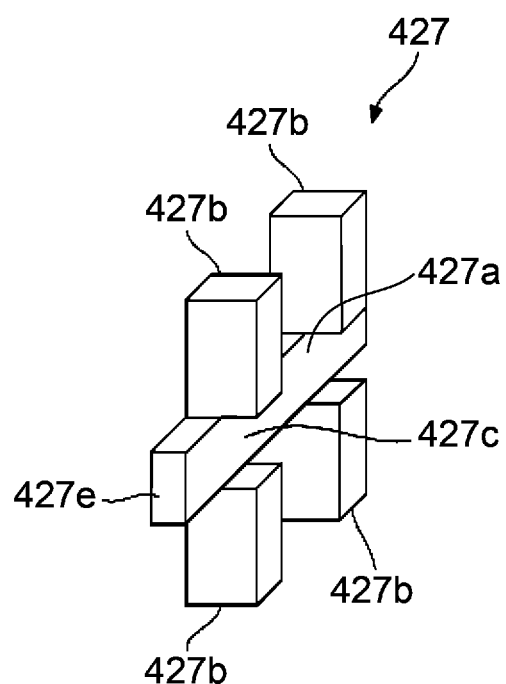
FIG. 13A is a perspective view of a first and second outer support members which are first and second outer support members according to a seventh embodiment of the present invention and with which the magnetic pole element illustrated in FIG. 6 can be configured.
Figure 13B:
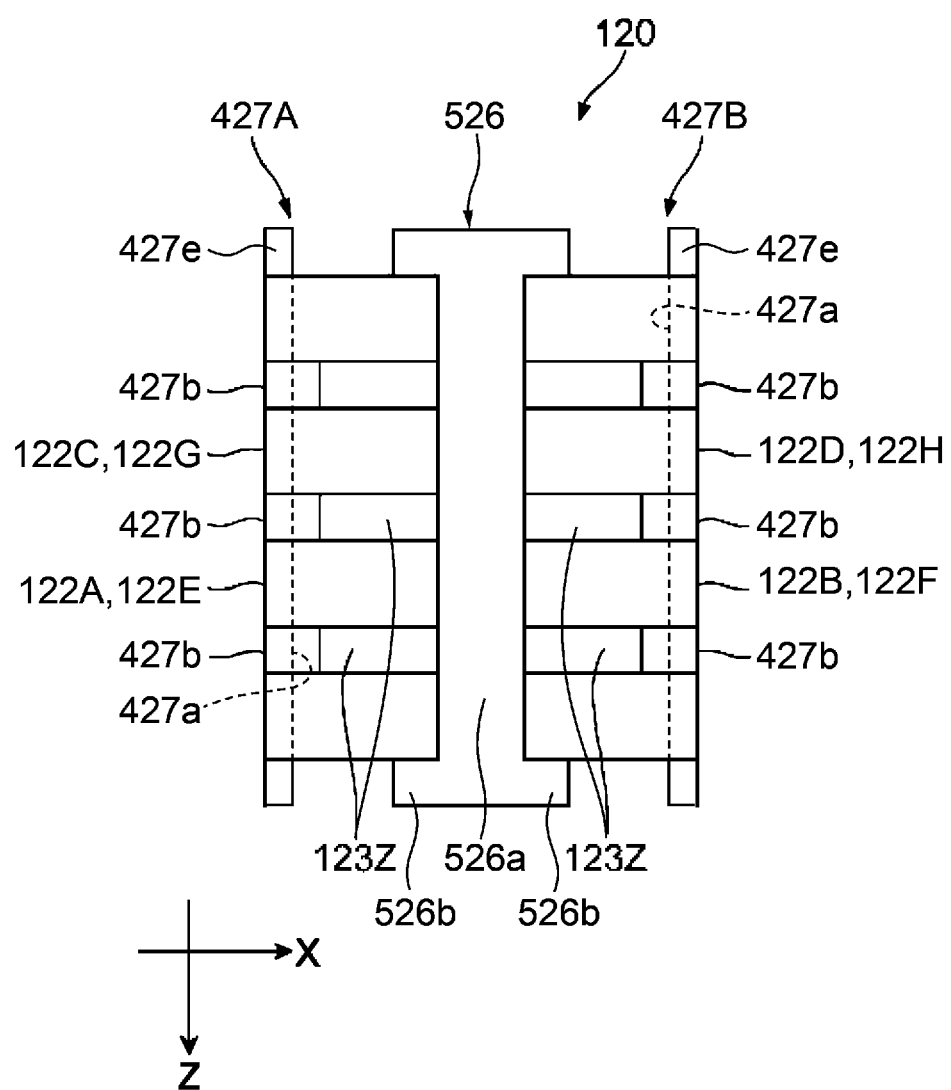
FIG. 13B is a front view of the magnetic pole element including the first outer support member illustrated in FIG. 13A.

FIG. 13A is a perspective view illustrating a first outer support member 427A and a second outer support member 427B according to a seventh embodiment of the present invention. FIG. 13B is a front view of the magnetic pole element 120 including the first and second outer support members 427A and 427B. Since the first and second outer support members 327A and 327B have the same shape, they are represented by the common drawing.

Although, as is the case with the first and second outer support members 327A and 327B illustrated in FIGS. 12A to 12C, the first and second outer support members 427A and 427B include an outer support member main body 427a extending in the first arrangement direction (Z-axis direction) and a plurality of interposition filling portions (first interposition filling portions) 427b projecting in the opposing direction (Y-axis direction) from the outer support member main body 427a, the first and second outer support members 427A and 427B are different from the first and second outer support members 327A and 327B in that the thickness dimension of the entirety of the outer support member main body 427a including a plurality of intersection portions 427c is smaller than the thickness dimension of the plurality of interposition filling portions 427b. Although the first and second outer support members 427A and 427B have a configuration the size and weight of which are further reduced compared to those of the outer support members 327A and 327B, the shape of the first and second outer support members 427A and 427B can suppress degradation of the strength of the magnetic pole element 120 caused by the reduction of the dimension of the first interposition permanent magnets 123Z in the second arrangement direction or the omission of the first interposition permanent magnets 123Z. Furthermore, displacement of the first interposition permanent magnets 123Z to the outside in the second arrangement direction can be suppressed.

Figure 14A:
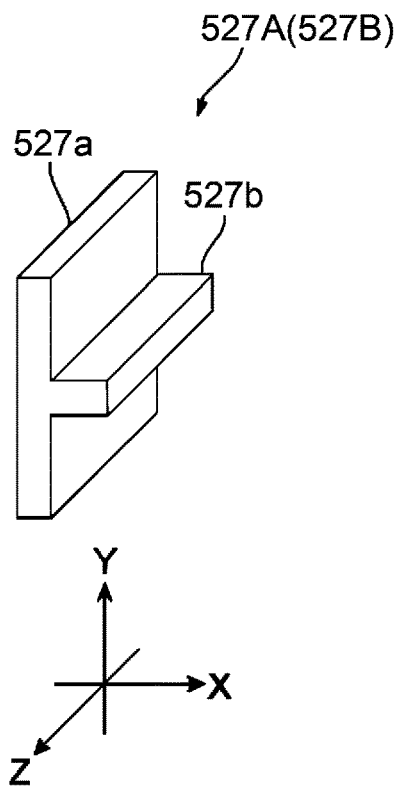
FIG. 14A is a perspective view of a first and second outer support members which are first and second outer support members according to an eighth embodiment of the present invention and with which the magnetic pole element illustrated in FIG. 6 can be configured.
Figure 14B:
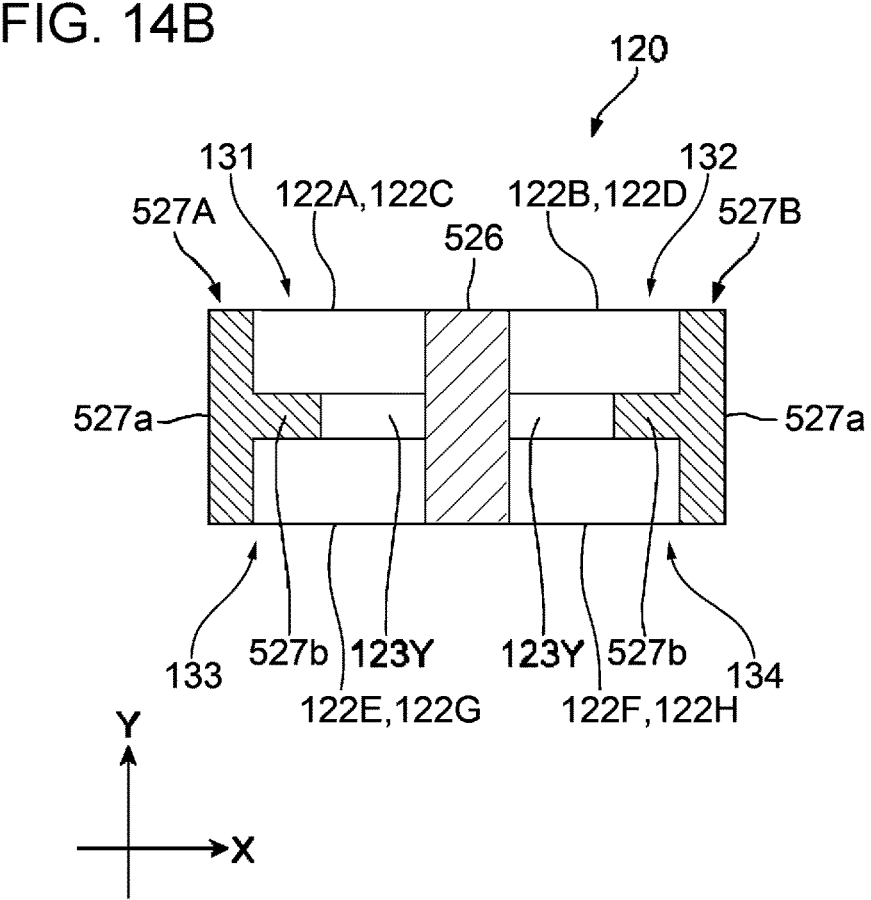
FIG. 14B is a front view of the magnetic pole element including the first and second outer support members illustrated in FIG. 14A.

FIG. 14A is a perspective view illustrating a first outer support member 527A and a second outer support member 527B according to an eighth embodiment of the present invention. FIG. 14B is a front view of the magnetic pole element 120 including the first and second outer support members 527A and 527B. Since the first and second outer support members 527A and 527B have the same shape, they are represented by the common drawing.

As is the case with the first and second outer support members 227A and 227B illustrated in FIGS. 11A to 11C, even when the back surface permanent magnets 123Y have a smaller dimension than the dimension of the plurality of magnetic element iron cores (first to eighth iron cores 122A to 122H) in the second arrangement direction (X-axis direction) as illustrated in FIG. 14B, the first and second outer support members 527A and 527B are aimed to fill at least parts of spaces caused by the smaller dimension of the back surface permanent magnets 123Y, thereby ensuring the strength of the magnetic pole element 120. Specifically, as illustrated in FIG. 14A, the first and second outer support members 527A and 527B have an outer support member main body 527a and an interposition filling portions 527b which are integrated with each other. As illustrated in FIG. 14B, the outer support member main bodies 527a are mounted on outer side surfaces (left and right outer side surfaces in FIG. 14B) of the plurality of magnetic element iron cores in the second arrangement direction (X-axis direction)). The interposition filling portions 527b project in the second arrangement direction (X-axis direction) from the outer support member main bodies 527a and fill at least part of the first interposition spaces formed outside the back surface permanent magnets 123Y (outside in the second arrangement direction) between the magnetic pole element iron cores adjacent to each other in the first arrangement direction.

Figure 15A:
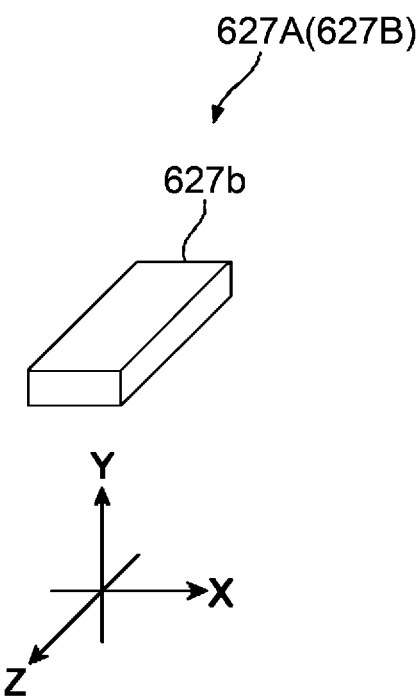
FIG. 15A is a perspective view of a first and second outer support members which are first and second outer support members according to a ninth embodiment of the present invention and with which the magnetic pole element illustrated in FIG. 6 can be configured.
Figure 15B:
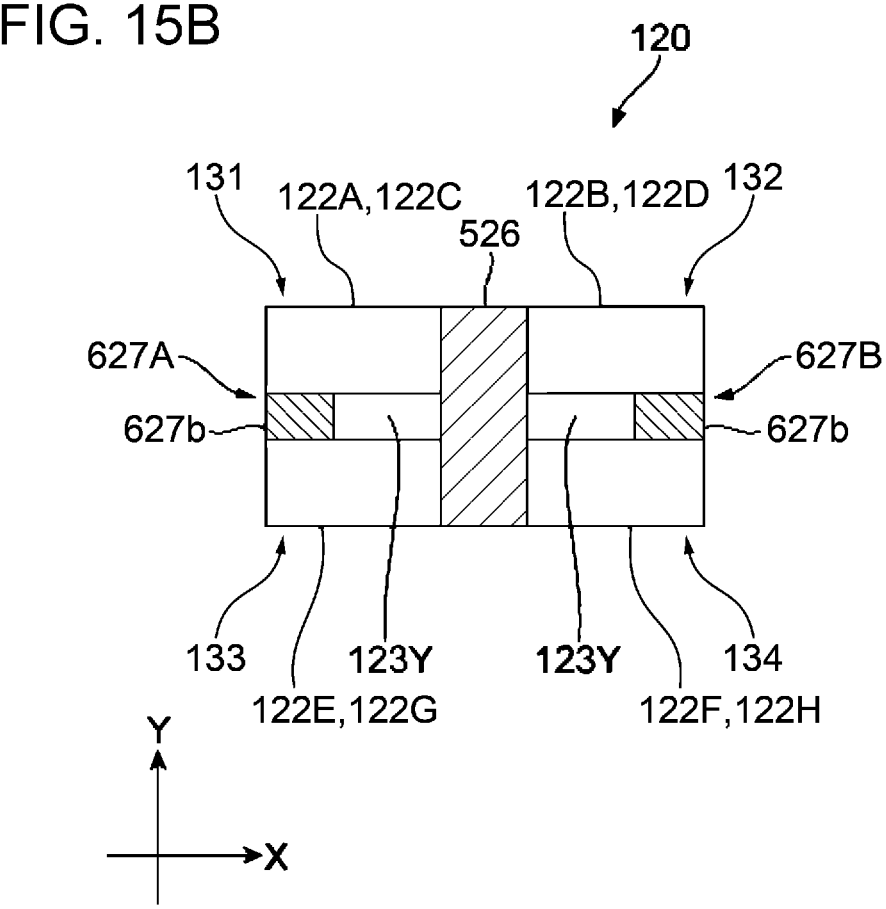
FIG. 15B is a sectional side view of the magnetic pole element including the first and second outer support members illustrated in FIG. 15A.

FIG. 15A is a perspective view illustrating a first outer support member 627A and a second outer support member 627B according to a ninth embodiment of the present invention. FIG. 15B is a front view of the magnetic pole element 120 including the first and second outer support members 627A and 627B. Since the first and second outer support members 627A and 627B have the same shape, they are represented by the common drawing.

The first and second outer support members 627A and 627B are formed by omitting the outer support member main body 527a from the first and second outer support members 527A and 527B illustrated in FIGS. 14A and 14B. That is, each of the first and second outer support members 627A and 627B includes, as illustrated in FIG. 15B, only an interposition filling portion 627b that fills at least part of the first interposition space outside the back surface permanent magnet 123Y.

The present invention is not limited to the above-described embodiments. For example, the plurality of magnetic element iron cores of the magnetic pole element 120 include not only the first and third iron cores 122A and 122C included in the first iron core row 131 and the second and fourth iron cores 122B and 122D included in the second iron core row 132 but also the fifth and seventh iron cores 122E and 122G included in the third iron core row 133 and the sixth and eighth iron cores 122F and 122H included in the fourth iron core row 134. However, the inclusion of the fifth to eighth iron cores 122E to 122H included in the third and fourth iron core rows is optional. That is, when the magnetic pole element of the magnetic field generating device according to the present invention includes at least the first to fourth iron cores, the magnetic pole element can form an effective magnetic field with the facing magnetic body facing the first to fourth iron cores (for example, the armature 110 facing the first to fourth magnetic pole surfaces 124A to 124D of the first to fourth iron cores 122A to 122D out of the pair of armatures 110 illustrated in FIG. 4) and can be moved relative to the facing magnetic body in the drive direction (first arrangement direction; Z-axis direction) by the armature coils attached to the facing magnetic body.

As described above, a magnetic field generating device that can generate a large amount of magnetic flux with a simple structure and an electric motor including this magnetic field generating device are provided.

A magnetic field generating device that is provided includes a magnetic pole element and a facing magnetic body. The magnetic pole element includes a plurality of magnetic element iron cores, a plurality of permanent magnets, and at least one support member. The plurality of magnetic element iron cores are each formed of a magnetic material, and the at least one support member is formed of a non-magnetic material. The facing magnetic body is disposed so as to face the magnetic pole element in an opposing direction with a gap interposed between the facing magnetic body and the magnetic pole element. The plurality of magnetic element iron cores are arranged along an arrangement plane perpendicular to the opposing direction. The plurality of magnetic element iron cores include a plurality of first iron cores, a plurality of second iron cores, a plurality of third iron cores, and a plurality of fourth iron cores. The plurality of first iron cores and the plurality of third iron cores are disposed so as to be alternately arranged along a first arrangement direction extending along the arrangement plane, thereby forming a first iron core row. The plurality of second iron cores and the plurality of fourth iron cores are disposed so as to be alternately arranged along the first arrangement direction, thereby forming a second iron core row. The plurality of first iron cores are respectively adjacent to the plurality of second iron cores in a second arrangement direction. The second arrangement direction is a direction extending along the arrangement plane and perpendicular to the first arrangement direction. The plurality of third iron cores are respectively adjacent to the plurality of fourth iron cores in the second arrangement direction. The first iron cores include a first magnetic pole surface that has a first magnetic pole and that faces the facing magnetic body in the opposing direction and a first back surface that faces an opposite side from the first magnetic pole surface in the opposing direction. The second iron cores include a second magnetic pole surface that has a second magnetic pole and that faces the facing magnetic body in the opposing direction and a second back surface that faces an opposite side from the second magnetic pole surface in the opposing direction. The third iron cores include a third magnetic pole surface that has a third magnetic pole and that faces the facing magnetic body in the opposing direction and a third back surface that faces an opposite side from the third magnetic pole surface in the opposing direction. The fourth iron cores include a fourth magnetic pole surface that has a fourth magnetic pole and that faces the facing magnetic body in the opposing direction and a fourth back surface that faces an opposite side from the fourth magnetic pole surface in the opposing direction. The plurality of permanent magnets include a plurality of back surface permanent magnets respectively disposed on the first back surface, the second back surface, the third back surface, and the fourth back surface. The first magnetic pole and the fourth magnetic pole are magnetic poles that are identical to each other and that are opposite to both the second magnetic pole and the third magnetic pole. The second magnetic pole and the third magnetic pole are magnetic poles that are identical to each other and that are opposite to both the first magnetic pole and the fourth magnetic pole. The at least one support member includes an inner support member positioned between the first iron core row and the second iron core row. The inner support member supports the plurality of first iron cores and the plurality of third iron cores on one side of the inner support member in the second arrangement direction, and simultaneously, supports the plurality of second iron cores and the plurality of fourth iron cores on another side of the inner support member in the second arrangement.

The inner support member can efficiently support the first to fourth iron cores on both sides of the inner support member in the second arrangement direction with a simple structure. Furthermore, the first iron cores and the third iron cores included in the first iron core row are respectively adjacent to the second iron cores and the fourth iron cores included in the second iron core row in the second arrangement direction, and the plurality of back surface permanent magnets are respectively disposed on the first to fourth back surfaces of the first to fourth iron cores. Thus, a large amount of magnetic flux can be generated.

Preferably, the inner support member is continuously interposed between the first iron core row and the second iron core row in an entire region in the first arrangement direction. Thus, the inner support member can have a high strength and stiffness to stably support the first and second iron core rows.

A recessed portion that is recessed in a direction separating from the inner support member along the second arrangement direction is preferably formed in at least a subset of magnetic pole element iron cores out of the plurality of magnetic element iron cores, the inner support member preferably includes a projection portion corresponding to the recessed portion, and the projection portion preferably projects toward the recessed portion in the second arrangement direction and is fitted into the recessed portion. Fitting of the projection portion into the recessed portion can improve joining strength of the magnetic element iron cores to the inner support member. In addition, a surface where the recessed portion is formed is a different surface from a surface that faces in the opposing direction in each of the plurality of magnetic pole element iron cores, an influence of the recessed portion on the magnetic flux formed between the magnetic pole element and the facing magnetic body that faces the magnetic pole element in the opposing direction is small.

Preferably, the inner support member includes an extension portion that extends in the opposing direction toward the facing magnetic body, extending beyond the first magnetic pole surface, the second magnetic pole surface, the third magnetic pole surface, and the fourth magnetic pole surface. Thus, the inner support member can have a large sectional area without a significant increase in the size of the inner support member.

In the above-described form of implementation, the plurality of permanent magnets may further include a plurality of second interposition permanent magnets respectively interposed between magnetic pole element iron cores adjacent to each other in the second arrangement direction out of the plurality of magnetic element iron cores, and each of the plurality of second interposition permanent magnets may be incorporated in the inner support member such that at least a part of the second interposition permanent magnet is positioned at the extension portion. Thus, while having a high stiffness by using the extension portion, the inner support member can be interposed between the plurality of magnetic element iron cores with the plurality of second interposition permanent magnets incorporated in the inner support member.

Preferably, the plurality of permanent magnets further include a plurality of first interposition permanent magnets respectively interposed between magnetic pole element iron cores adjacent to each other in the first arrangement direction out of the plurality of magnetic element iron cores. The plurality of first interposition permanent magnets allow more effective generation of a large amount of magnetic flux.

The at least one support member may further include a first outer support member disposed on an opposite side from the inner support member with the first iron core row interposed between the inner support member and the first outer support member in the second arrangement direction, and a second outer support member disposed on an opposite side from the inner support member with the second iron core row interposed between the inner support member and the second outer support member in the second arrangement direction.

When the plurality of first interposition permanent magnets have a smaller dimension than a dimension of each of the plurality of magnetic element iron cores in the second arrangement direction, the first outer support member preferably includes a plurality of first interposition filling portions that fill at least parts of a plurality of first interposition spaces provided outside the first interposition permanent magnets in the second arrangement direction between the magnetic pole element iron cores adjacent to each other in the first iron core row, and the second outer support member preferably includes a plurality of second interposition filling portions that fill at least parts of a plurality of second interposition spaces provided outside the first interposition permanent magnets in the second arrangement direction between the magnetic pole element iron cores adjacent to each other in the second iron core row. Even when the plurality of first interposition permanent magnets have a smaller dimension than a dimension of each of the plurality of magnetic element iron cores in the second arrangement direction, the first and second interposition filling portions fill at least parts of the spaces formed by this to allow the entirety of the magnetic pole element to have a higher strength. Furthermore, the first and second interposition filling portions can suppress displacement of the first interposition permanent magnets to the outside in the second arrangement direction.

In the above-described form of implementation, when the plurality of back surface permanent magnets have a smaller dimension than the dimension of each of the plurality of magnetic element iron cores in the second arrangement direction, the first outer support member preferably further includes a first back surface filling portion that fills at least part of a first back surface space facing the first back surface and the third back surface at a position outside the back surface permanent magnets in the second arrangement direction, and the second outer support member preferably further includes a second back surface filling portion that fills at least part of a second back surface space facing the second back surface and the fourth back surface at a position outside the back surface permanent magnets in the second arrangement direction. Even when not only the dimension of the plurality of first interposition permanent magnets but also the dimension of the back surface permanent magnets is reduced, the first and second outer support members can effectively suppress reduction of the strength of the magnetic pole element due to the reduction in the dimension and effectively suppress displacement of the back surface permanent magnets to the outside in the second arrangement direction.

The inner support member may include a part interposed between the magnetic pole element iron cores adjacent to each other in the first arrangement direction out of the plurality of magnetic element iron cores. The above-described part can effectively receive a load applied to the magnetic pole element in the first arrangement direction.

The magnetic field generating device can cooperate with a coil attached to the facing magnetic body to configure a simply structured electric motor with a high drive efficiency. The coil forms a magnetic field that moves the magnetic pole element relative to the facing magnetic body in the first arrangement direction.

The invention claimed is:
1. A magnetic field generating device comprising:
a magnetic pole element that includes
a plurality of magnetic element iron cores,
a plurality of permanent magnets, and
at least one support member,
the plurality of magnetic element iron cores each being formed of a magnetic material, and the at least one support member being formed of a non-magnetic material; and
a facing magnetic body disposed so as to face the magnetic pole element in an opposing direction with a gap interposed between the facing magnetic body and the magnetic pole element, wherein
the plurality of magnetic element iron cores are arranged along an arrangement plane perpendicular to the opposing direction, wherein
the plurality of magnetic element iron cores include
a plurality of first iron cores,
a plurality of second iron cores,
a plurality of third iron cores, and
a plurality of fourth iron cores, wherein
the plurality of first iron cores and the plurality of third iron cores are disposed so as to be alternately arranged along a first arrangement direction extending along the arrangement plane, thereby forming a first iron core row,
the plurality of second iron cores and the plurality of fourth iron cores are disposed so as to be alternately arranged along the first arrangement direction, thereby forming a second iron core row,
the plurality of first iron cores are respectively adjacent to the plurality of second iron cores in a second arrangement direction, and the second arrangement direction is a direction extending along the arrangement plane and perpendicular to the first arrangement direction, and
the plurality of third iron cores are respectively adjacent to the plurality of fourth iron cores in the second arrangement direction, wherein
the first iron cores include
a first magnetic pole surface that has a first magnetic pole and that faces the facing magnetic body in the opposing direction, and
a first back surface that faces an opposite side from the first magnetic pole surface in the opposing direction,
the second iron cores include,
a second magnetic pole surface that has a second magnetic pole and that faces the facing magnetic body in the opposing direction, and
a second back surface that faces an opposite side from the second magnetic pole surface in the opposing direction,
the third iron cores include
a third magnetic pole surface that has a third magnetic pole and that faces the facing magnetic body in the opposing direction, and
a third back surface that faces an opposite side from the third magnetic pole surface in the opposing direction, and
the fourth iron cores include a fourth magnetic pole surface that has a fourth magnetic pole and that faces the facing magnetic body in the opposing direction, and a fourth back surface that faces an opposite side from the fourth magnetic pole surface in the opposing direction, wherein the plurality of permanent magnets include a plurality of back surface permanent magnets respectively disposed on the first back surface, the second back surface, the third back surface, and the fourth back surface, wherein the first magnetic pole and the fourth magnetic pole are magnetic poles that are identical to each other and that are opposite to both the second magnetic pole and the third magnetic pole, and the second magnetic pole and the third magnetic pole are magnetic poles that are identical to each other and that are opposite to both the first magnetic pole and the fourth magnetic pole, and wherein the at least one support member includes an inner support member positioned between the first iron core row and the second iron core row, and the inner support member supports the plurality of first iron cores and the plurality of third iron cores on one side of the inner support member in the second arrangement direction, and simultaneously, supports the plurality of second iron cores and the plurality of fourth iron cores on another side of the inner support member in the second arrangement.

2. The magnetic field generating device according to claim 1, wherein the inner support member is continuously interposed between the first iron core row and the second iron core row in an entire region in a direction perpendicular to the arrangement plane between the first iron core row and the second iron core row.

3. The magnetic field generating device according to claim 1, wherein a recessed portion that is recessed in a direction separating from the inner support member along the second arrangement direction is formed in at least a subset of magnetic pole element iron cores out of the plurality of magnetic element iron cores, and wherein the inner support member includes a projection portion corresponding to the recessed portion, and the projection portion projects toward the recessed portion in the second arrangement direction and is fitted into the recessed portion.

4. The magnetic field generating device according to claim 1, wherein the inner support member includes an extension portion that extends in the opposing direction toward the facing magnetic body, extending beyond the first magnetic pole surface, the second magnetic pole surface, the third magnetic pole surface, and the fourth magnetic pole surface.

5. The magnetic field generating device according to claim 4, wherein the plurality of permanent magnets further include a plurality of second interposition permanent magnets respectively interposed between magnetic pole element iron cores adjacent to each other in the second arrangement direction out of the plurality of magnetic element iron cores, and wherein each of the plurality of second interposition permanent magnets is incorporated in the inner support member such that at least a part of the second interposition permanent magnet is positioned at the extension portion.

6. The magnetic field generating device according to claim 1, wherein the plurality of permanent magnets further include a plurality of first interposition permanent magnets respectively interposed between magnetic pole element iron cores adjacent to each other in the first arrangement direction out of the plurality of magnetic element iron cores.

7. The magnetic field generating device according to claim 6, wherein the at least one support member further includes a first outer support member disposed on an opposite side from the inner support member with the first iron core row interposed between the inner support member and the first outer support member in the second arrangement direction, and a second outer support member disposed on an opposite side from the inner support member with the second iron core row interposed between the inner support member and the second outer support member in the second arrangement direction, wherein the plurality of first interposition permanent magnets have a smaller dimension than a dimension of each of the plurality of magnetic element iron cores in the second arrangement direction, and wherein the first outer support member includes a plurality of first interposition filling portions that fill at least parts of a plurality of first interposition spaces provided outside the first interposition permanent magnets in the second arrangement direction between the magnetic pole element iron cores adjacent to each other in the first iron core row, and the second outer support member includes a plurality of second interposition filling portions that fill at least parts of a plurality of second interposition spaces provided outside the first interposition permanent magnets in the second arrangement direction between the magnetic pole element iron cores adjacent to each other in the second iron core row.

8. The magnetic field generating device according to claim 7, wherein the plurality of back surface permanent magnets have a smaller dimension than the dimension of each of the plurality of magnetic element iron cores in the second arrangement direction, and wherein the first outer support member further includes a first back surface filling portion that fills at least part of a first back surface space facing the first back surface and the third back surface at a position outside the back surface permanent magnets in the second arrangement direction, and the second outer support member further includes a second back surface filling portion that fills at least part of a second back surface space facing the second back surface and the fourth back surface at a position outside the back surface permanent magnets in the second arrangement direction.

9. The magnetic field generating device according to claim 1, wherein the plurality of back surface permanent magnets have a smaller dimension than a dimension of each of the plurality of magnetic element iron cores in the second arrangement direction, wherein the at least one support member further includes a first outer support member disposed on an opposite side from the inner support member with the first iron core row interposed between the inner support member and the first outer support member in the second arrangement direction, and a second outer support member disposed on an opposite side from the inner support member with the second iron core row interposed between the inner support member and the second outer support member in the second arrangement direction, and wherein the first outer support member further includes a first back surface filling portion that fills at least part of a first back surface space facing the first back surface and the third back surface at a position outside the back surface permanent magnets in the second arrangement direction, and the second outer support member further includes a second back surface filling portion that fills at least part of a second back surface space facing the second back surface and the fourth back surface at a position outside the back surface permanent magnets in the second arrangement direction.

10. The magnetic field generating device according to claim 1, wherein the inner support member includes a part interposed between the magnetic pole element iron cores adjacent to each other in the first arrangement direction out of the plurality of magnetic element iron cores.

11. An electric motor comprising:

the magnetic field generating device according to claim 1; and a coil that is attached to the facing magnetic body in the magnetic field generating device and that forms a magnetic field that moves the magnetic pole element relative to the facing magnetic body in the first arrangement direction.

* * * * *